(12) United States Patent
Togami

(10) Patent No.: US 6,394,897 B1
(45) Date of Patent: May 28, 2002

(54) VOLLEYBALL VIDEO GAME SYSTEM

(75) Inventor: Kenji Togami, Tokyo (JP)

(73) Assignee: Konami Co., Ltd., Kobe (JP)

( * ) Notice: Subject to any disclaimer, the term of this patent is extended or adjusted under 35 U.S.C. 154(b) by 0 days.

(21) Appl. No.: 09/650,985

(22) Filed: Aug. 30, 2000

Related U.S. Application Data

(62) Division of application No. 09/067,894, filed on Apr. 28, 1998.

(30) Foreign Application Priority Data

| May 2, 1997 | (JP) | ............................................. 9-130486 |
| May 2, 1997 | (JP) | ............................................. 9-130487 |
| May 2, 1997 | (JP) | ............................................. 9-130488 |

(51) Int. Cl.$^7$ ................................................. A63F 9/24
(52) U.S. Cl. ........................... 463/4; 463/31; 273/317.1
(58) Field of Search ............................... 463/1, 2, 3, 4, 463/7, 29–33, 40, 49, 50; 273/317.1, 317.3, 108.1; 345/156

(56) References Cited

U.S. PATENT DOCUMENTS

| 4,662,635 A | * | 5/1987 | Enokian | ...................... 273/94 |
| 5,534,917 A | * | 7/1996 | MacDougall | ................ 348/169 |
| 5,779,548 A | * | 7/1998 | Asai et al. | ..................... 463/31 |
| 6,056,640 A | * | 5/2000 | Schaaij | ........................... 463/4 |

FOREIGN PATENT DOCUMENTS

JP             7-178242         7/1995

* cited by examiner

Primary Examiner—Joe H. Cheng
Assistant Examiner—Kim T. Nguyen
(74) Attorney, Agent, or Firm—Jordan and Hamburg LLP

(57) ABSTRACT

A CPU determines the position of a ball in a virtual game space, and moves a viewpoint based on viewpoint data and the position of the ball. The CPU displays on a monitor TV a portion of a volleyball court in a visible range based on the viewpoint and the direction of an axis thereof. The CPU determines a landing position of the ball, displays a first cursor at the landing position, and displays a player character as it receives the ball when the distance between the player character and the first cursor becomes a predetermined distance before the ball reaches the landing position. When a served ball is received by a player character, the CPU selects a player character to make an attacking action. The CPU assigns a button to the selected player character. When the ball is set by a player character as a setter, the CPU assigns an attack button, and controls the selected player character to perform the attacking action in response to an input signal from the attack button.

15 Claims, 18 Drawing Sheets

FIG.12A

| TIMING | LANDING POSITION | ARRIVAL TIME |
|---|---|---|
| — | — | — |
| — | — | — |
| — | — | — |
| ⋮ | ⋮ | ⋮ |

| RANDOM NUMBER | LANDING POSITION | ARRIVAL TIME |
|---|---|---|
| — | — | — |
| — | — | — |
| — | — | — |
| ⋮ | ⋮ | ⋮ |

4b

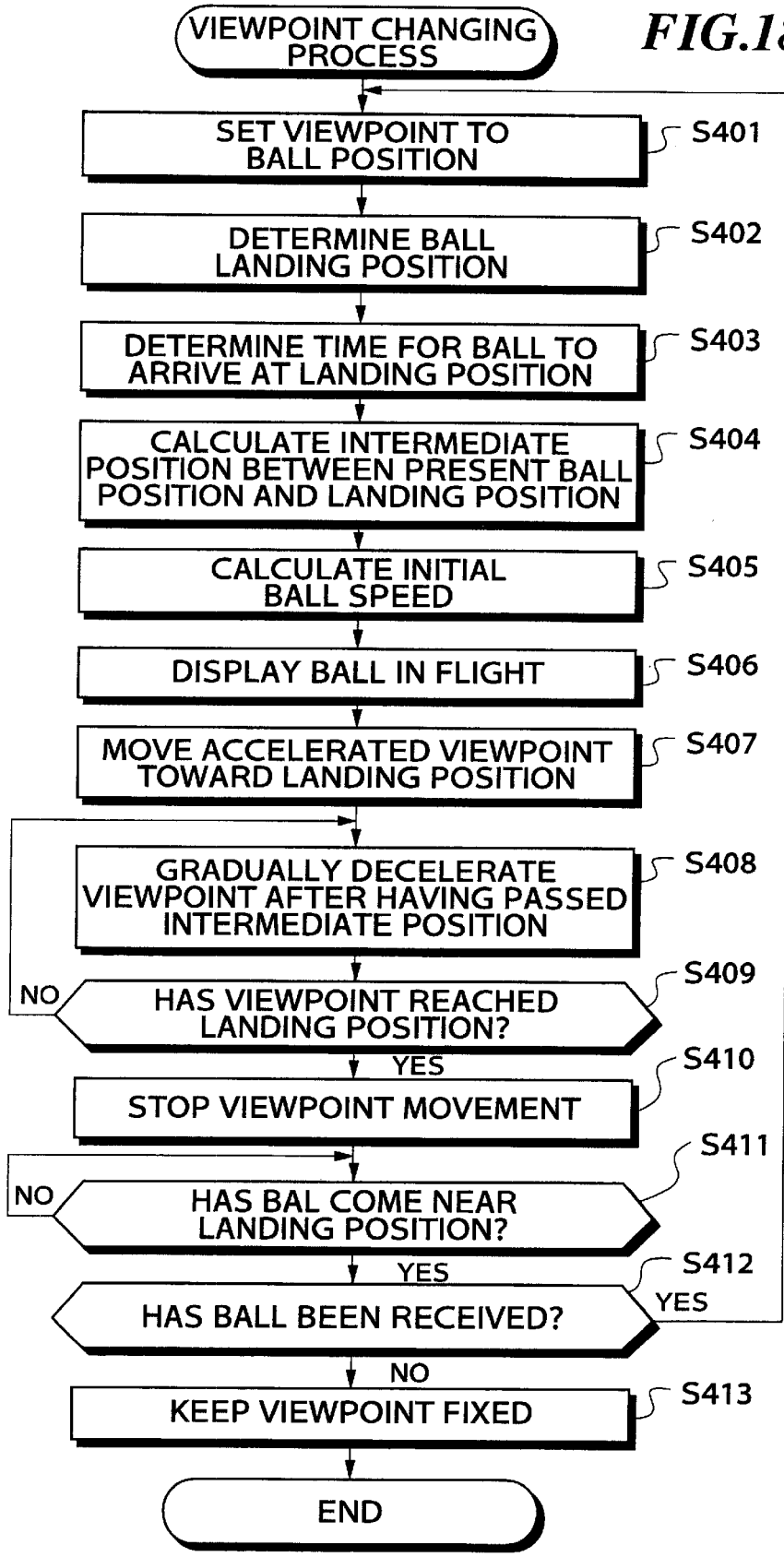

VOLLEYBALL VIDEO GAME SYSTEM

This is a divisional of application Ser. No. 09/067,894 file Apr. 28, 1998.

BACKGROUND OF THE INVENTION

1. Field of the Invention

The present invention relates to a video game machine for playing a volleyball video game, a method of processing video game images for such a video game machine, and a recording medium which stores a computer program for such a volleyball video game.

2. Description of the Prior Art

There has been known a video game machine for playing a volleyball video game on a virtual volleyball court displayed on a television monitor. The television monitor also displays two virtual volleyball teams on the displayed virtual volleyball court. The game player controls player characters of one of the two volleyball teams to play the game against the other volleyball team on the volleyball court.

The conventional volleyball video game machine has suffered the following problems:

The conventional volleyball video game machine displays the entire volleyball court in a game space on the television monitor. Therefore, the player characters of the virtual volleyball teams who play the volleyball are displayed in a very small size, and hence their movements cannot be displayed realistically.

Another conventional volleyball video game machine alternatively displays volleyball court sections occupied by respective volleyball teams such that one of the volleyball court sections is displayed with the ball as it moves from one of the volleyball teams to the other. This volleyball video game machine is capable of displaying the player characters of t he volleyball teams in a relatively large size. However, if the switching between the volleyball court sections is made frequent because of a quick exchange of the volleyball between the volleyball teams, then the game player may not be able to follow the displayed ball.

The conventional volleyball video game machines include a controller having direction keys that can be operated by the game player to move player characters of its own forward, backward, leftward, and rightward on the volleyball court, and buttons that can also b e operated by the game player to control game players of its own to make actions to receive, serve, and attack in the game. The game player manually operates the controller to control movements of the player characters.

For example, the game player operates the controller to control a player character to make a receiving action, as follows: The game player operates a direction key to move the player character until a hand of the player character overlaps an expected ball fall position, and then presses a button immediately before the hand of the player character overlaps the ball, whereupon the player character makes a receiving action.

The control operation which the game player carries out to control a player character to make a receiving action requires a considerably level of skill. It is highly difficult or almost impossible for game players who are not familiar with the conventional volleyball video game machines or the controller to perform the above control operation on the controller. Since volleyball is a game in which an error is declared when the ball touches the floor, if the game player fails to properly control a player character to make a receiving action, then the game player tends to suffer an error each time a player character does not successfully receive the ball, and therefore cannot enjoy the video game.

Still another drawback with the conventional volleyball video game machines will be described below. When the game player controls a player character of its own to make an attacking action, the ball hit by the player character has an essentially constant strength of power. Stated otherwise, the conventional volleyball video game machines do not allow the game player to control a player character of its own to make a variety of attacking actions. Consequently, the game player feels somewhat unsatisfactory and is not strongly attracted to the volleyball video game machine.

One of the actual volleyball attack techniques is known as a combination play. In the time-sequence combination, when a setter sets the ball, two or three attackers jumps at different times, and either one of them actually attacks the ball whereas the others fakes spiking in an attempt to deceive the opposing blockers of the offensive team. However, none of the conventional volleyball video game machines have a function which allows the game player to control a plurality of player characters to engage in the combination play. Accordingly, game players cannot enjoy volleyball games similar to actual volleyball on the conventional volleyball video game machines, and are likely to lose their interest in the conventional volleyball video game machines.

SUMMARY OF THE INVENTION

It is therefore an object of the present invention to provide a video game machine for playing a volleyball video game, the video game machine being capable of displaying movements of player characters realistically on a television monitor, a method of processing video game images for such a video game machine, and a recording medium which stores a computer program for such a volleyball video game.

Another object of the present invention is to provide a video game machine for playing a volleyball video game which is attractive to a game player irrespective of how skilled the game player may be, a method of processing video game images for such a video game machine, and a recording medium which stores a computer program for such a volleyball video game.

Still another object of the present invention is to provide a video game machine for playing a volleyball video game which is similar to actual volleyball, making the volleyball video game which is attractive to a game player, a method of processing video game images for such a video game machine, and a recording medium which stores a computer program for such a volleyball video game.

According to an aspect of the present invention, there is provided a video game machine for playing a volleyball video game, comprising a monitor for displaying two volleyball teams on a court in a virtual space, at least one of the volleyball teams having a plurality of player characters controllable by a game player. The video game machine also has data holding means for holding data of a viewpoint to establish a game space in the virtual space displayed on the monitor, position determining means for determining the position of a ball in the virtual space, moving means for moving the viewpoint depending on the data of the viewpoint and the determined position of the ball, and display processing means for displaying the virtual space on the monitor within a visible range determined by the viewpoint and the direction of an axis thereof.

According to another aspect of the present invention, there is provided a method of processing video game images for a video game machine for playing a volleyball video game by displaying two volleyball teams on a court in a virtual space, at least one of the volleyball teams having a plurality of player characters controllable by a game player. The method comprises the steps of holding data of a viewpoint to establish a game space in the virtual space displayed on the monitor, determining the position of a ball in the virtual space, moving the viewpoint depending on the data of the viewpoint and the determined position of the ball, and displaying the virtual space on the monitor within a visible range determined by the viewpoint and the direction of an axis thereof.

According to still another aspect of the present invention, there is provided a recording medium storing a computer program for controlling a video game machine for playing a volleyball video game to display two volleyball teams on a court in a virtual space, at least one of the volleyball teams having a plurality of player characters controllable by a game player. The computer program comprises the steps of holding data of a viewpoint to establish a game space in the virtual space displayed on the monitor, determining the position of a ball in the virtual space, moving the viewpoint depending on the data of the viewpoint and the determined position of the ball, and displaying the virtual space on the monitor within a visible range determined by the viewpoint and the direction of an axis thereof.

According to yet still another aspect of the present invention, there is provided a video game machine for playing a volleyball video game, comprising a monitor for displaying two volleyball teams on a court in a virtual space, at least one of the volleyball teams having a plurality of player characters controllable by a game player. The video game machine also has control means operable by the game player for controlling player characters, position determining means for determining a landing position of a ball in the virtual space, indicating means for displaying an indicia at the determined landing position of the ball on the monitor, and action control means for controlling either one of the player characters to make a receiving action to receive the ball when the either one of the player characters and the indicia are spaced from each other by a predetermined distance until the ball reaches the landing position.

According to a further aspect of the present invention, there is provided a method of processing video game images for a video game machine for playing a volleyball video game by displaying two volleyball teams on a court in a virtual space, at least one of the volleyball teams having a plurality of player characters controllable by a game player. The method comprises the steps of determining a landing position of a ball in the virtual space, displaying an indicia at the determined landing position of the ball on the monitor, and controlling either one of the player characters to make a receiving action to receive the ball when the either one of the player characters and the indicia are spaced from each other by a predetermined distance until the ball reaches the landing position.

According to a still further aspect of the present invention, there is provided a recording medium storing a computer program for controlling a video game machine for playing a volleyball video game to display two volleyball teams on a court in a virtual space, at least one of the volleyball teams having a plurality of player characters controllable by a game player. The computer program comprises the steps of determining a landing position of a ball in the virtual space, displaying an indicia at the determined landing position of the ball on the monitor, and controlling either one of the player characters to make a receiving action to receive the ball when the either one of the player characters and the indicia are spaced from each other by a predetermined distance until the ball reaches the landing position.

According to a yet still further aspect of the present invention, there is provided a video game machine for playing a volleyball video game, comprising a monitor for displaying two volleyball teams on a court in a virtual space, at least one of the volleyball teams having a plurality of player characters controllable by a game player. the video game machine also has control means operable by the game player for controlling player characters, selecting means for selecting a player character to make an attacking action when either one of the player characters receives a ball, receiving means for receiving an input signal from the control means for the selected player character when a player character as a setter sets the ball, and action control means for controlling the selected player character to make the attacking action to attack the ball in response to the received input signal.

According to another aspect of the present invention, there is provided a video game machine for playing a volleyball video game, comprising a monitor for displaying two volleyball teams on a court in a virtual space, at least one of the volleyball teams having a plurality of player characters controllable by a game player. The video game machine also has control means operable by the game player for controlling player characters, selecting means for selecting a plurality of player characters to make an attacking action when either one of the player characters receives a ball, receiving means for receiving input signals from the control means for the selected player characters when a player character as a setter sets the ball, and action control means for controlling either one the selected player characters to fake the attacking action and controlling either one of the selected player characters to make the attacking action in response to the input signals.

According to still another aspect of the present invention, there is provided a video game machine for playing a volleyball video game, comprising a monitor for displaying two volleyball teams on a court in a virtual space, at least one of the volleyball teams having a plurality of player characters controllable by a game player. The video game machine also has control means operable by the game player for controlling player characters, selecting means for selecting a plurality of player characters to make a blocking action when one of the player characters as a setter of an opposing one of the volleyball team sets a ball, receiving means for receiving an input signal from the control means for the selected player characters, and action control means for controlling the selected player characters to make the blocking action in response to the input signal.

According to yet still another aspect of the present invention, there is provided a method of processing video game images for a video game machine for playing a volleyball video game by displaying two volleyball teams on a court in a virtual space, at least one of the volleyball teams having a plurality of player characters controllable by a game player. The method comprises the steps of selecting a player character to make an attacking action when either one of the player characters receives a ball, receiving an input signal for the selected player character when a player character as a setter sets the ball, and controlling the selected player character to make the attacking action to attack the ball in response to the received input signal.

According to a further aspect of the present invention, there is provided a method of processing video game images for a video game machine for playing a volleyball video game by displaying two volleyball teams on a court in a virtual space, at least one of the volleyball teams having a plurality of player characters controllable by a game player. The method comprises the steps of selecting a plurality of player characters to take part in an attacking action when either one of the player characters receives a ball, receiving input signals for the respective selected player characters when a player character as a setter sets the ball, and controlling either one of the selected player characters to fake the attacking action and controlling either one of the selected player characters to make the attacking action in response to the input signals.

According to a still further aspect of the present invention, there is provided a method of processing video game images for a video game machine for playing a volleyball video game by displaying two volleyball teams on a court in a virtual space, at least one of the volleyball teams having a plurality of player characters controllable by a game player. The method comprises the steps of selecting a plurality of player characters to make a blocking action when one of the player characters as a setter of an opposing one of the volleyball team sets a ball, receiving an input signal for the selected player characters, and controlling the selected player characters to make the blocking action in response to the input signal.

According to a yet still further aspect of the present invention, there is provided a recording medium storing a computer program for controlling a video game machine for playing a volleyball video game to display two volleyball teams on a court in a virtual space, at least one of the volleyball teams having a plurality of player characters controllable by a game player. The computer program comprises the steps of selecting a player character to make an attacking action when either one of the player characters receives a ball, receiving an input signal for the selected player character when a player character as a setter sets the ball, and controlling the selected player character to make the attacking action to attack the ball in response to the received input signal.

According to another aspect of the present invention, there is provided a recording medium storing a computer program for controlling a video game machine for playing a volleyball video game to display two volleyball teams on a court in a virtual space, at least one of the volleyball teams having a plurality of player characters controllable by a game player. The computer program comprises the steps of selecting a plurality of player characters to take part in an attacking action when either one of the player characters receives a ball, receiving input signals for the respective selected player characters when a player character as a setter sets the ball, and controlling either one of the selected player characters to fake the attacking action and controlling either one of the selected player characters to make the attacking action in response to the input signals.

According to still another aspect of the present invention, there is provided a recording medium storing a computer program for controlling a video game machine for playing a volleyball video game to display two volleyball teams on a court in a virtual space, at least one of the volleyball teams having a plurality of player characters controllable by a game player. The computer program comprises the steps of selecting a plurality of player characters to make a blocking action when one of the player characters as a setter of an opposing one of the volleyball team sets a ball, receiving an input signal for the selected player characters, and controlling the selected player characters to make the blocking action in response to the input signal.

The above and other objects, features, and advantages of the present invention will become apparent from the following description when taken in conjunction with the accompanying drawings which illustrate a preferred embodiment of the present invention by way of example.

BRIEF DESCRIPTION OF THE DRAWINGS

FIGS. 12A and 12B are diagrams of tables of landing positions;

FIG. 18 is a flowchart of a processing sequence of a viewpoint changing process.

DETAILED DESCRIPTION OF THE PREFERRED EMBODIMENT

Figure 1:
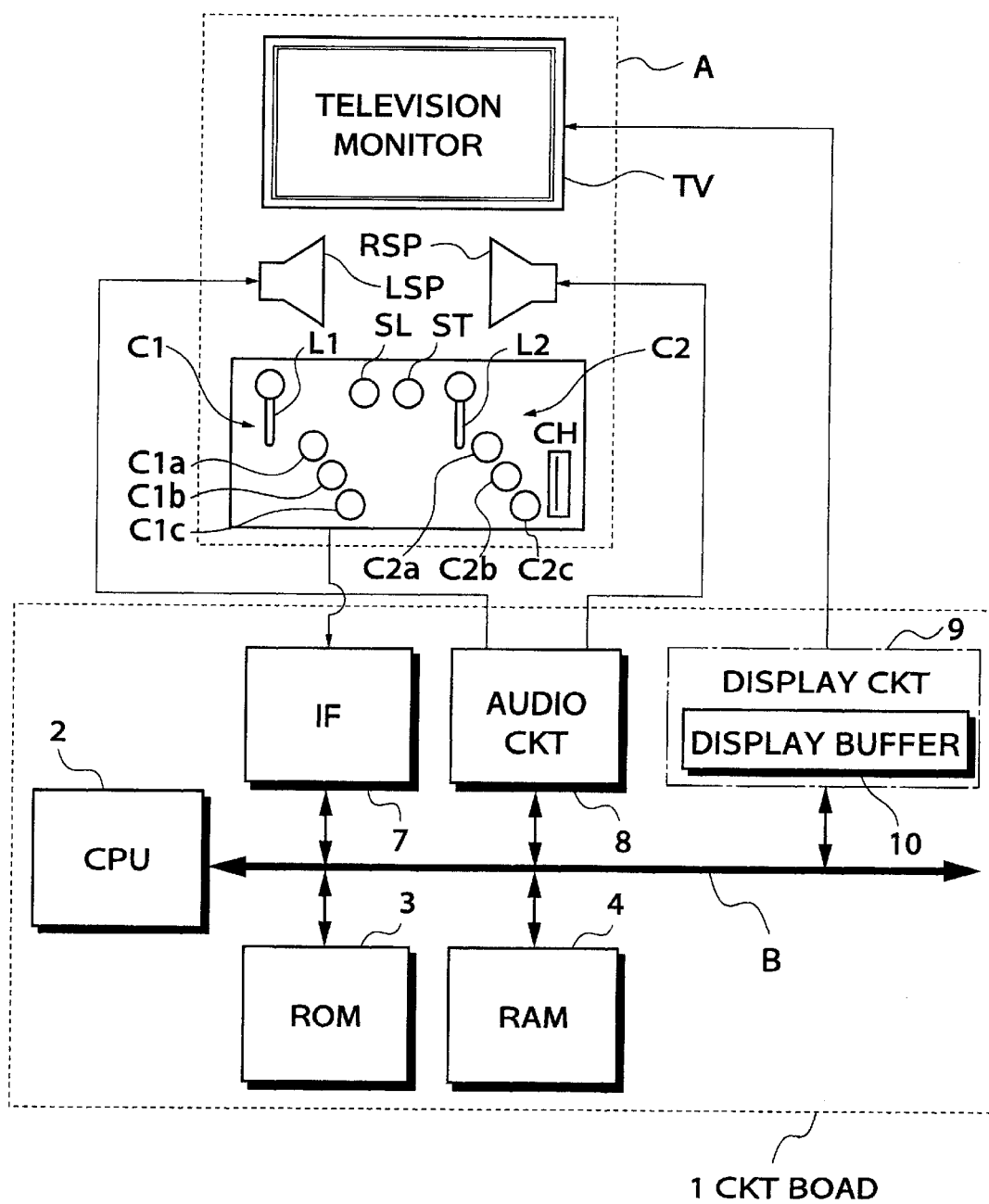
FIG. 1 is a block diagram of a video game machine for playing a volleyball video game according to the present invention.

Arrangement of Volleyball Game System:

An arrangement of a video game machine according to the present invention for playing a volleyball video game, i.e., a volleyball video game system, will be described below. FIG. 1 shows in block form the video game machine according to the present invention. As shown in FIG. 1, the video game machine comprises a video game assembly A and a circuit board 1 accommodated in the video game assembly A.

The video game assembly A comprises a television monitor (also referred to as a "monitor") TV, a pair of speakers LSP, RSP, and a control panel CP. The control panel CP has a first control system C1 and a second control system C2 which can be operated respectively by two game players so that a volleyball video game may be played by the two game players at the same time. The first control system C1 comprises a first lever L1 and a plurality of first buttons C1a–C1c, and the second control system C2 comprises a second lever L2 and a plurality of second buttons C2a–C2c. The control panel CP also has a start button SL for starting a volleyball video game from the first control system C1, a start button ST for starting a volleyball video game from the second control system C2, and a coin insertion slot CH.

The circuit board 1 comprises a CPU (Central Processing Unit) 2, a ROM (Read-Only Memory) 3, a RAM (Random-Access Memory) 4, an interface 7, an audio circuit 8, and a display circuit 9. The ROM 3, the RAM 4, the interface 7, the audio circuit 8, and the display circuit 9 are connected to the CPU 2 by a bus B which comprises an address bus, a data bus, and a control bus.

The ROM 3 stores a basic program serving as an operating system, a game program for a volleyball video game, and various data. The RAM 4 serves as a work memory area for the CPU 1 for temporarily storing various data. The interface 7 reads control data from the control panel CP. The audio circuit 8 supplies an audio signal to the speakers LSP, RSP. The display circuit 9 has a display buffer (VRAM) 10 for storing video data (image data) to be displayed on the monitor TV, and supplies a video signal (image signal) based on the video data stored in the display buffer 10 to the monitor TV.

The volleyball video game system shown in FIG. 1 basically operates as follows: When the volleyball video game system is switched on, the CPU 2 initializes the audio circuit 8, the display circuit 9, and the video game assembly 9 based on the operating system stored in the ROM 3.

Then, the CPU 2 reads the game program stored in the ROM 3 and data used in the execution of the game program, and loads the game program and the data into the RAM 4. The CPU 2 also reads volleyball image data from the ROM 3 and stores the volleyball image data into the RAM 4. Thereafter, the CPU 2 proceeds with the volleyball video game based on the game program loaded in the RAM 4 or input signals (commands) which the game player or players enter through the control panel CP. Specifically, the CPU 2 control image processing or controls internal processing based on the game program or commands from the game player or players. The image processing includes issuing various image displaying instructions to the display circuit 9, and the internal processing includes carrying out calculations depending on operations on the control panel CP.

One example of the image processing for displaying an image of a three-dimensional object using polygons on the television monitor TV will be described below. In the RAM 4, there is generated a table of absolute coordinate data of the polygons, angular displacement data of the object, and linear displacement data of the object. In the RAM 4, there is also generated a table of texture address data and color palette address data. The CPU 2 then reads the absolute coordinate data of the polygons, the angular displacement data of the object, and the linear displacement data of the object from the table in the RAM 4. The CPU 2 converts the absolute coordinate data of the polygons into polygon vertex address data which represent vertex position (coordinate) data in the display buffer 10 of the object that comprises a collection of polygons. The CPU 2 then reads the texture address data and the color palette address data from the table in the RAM 4. The CPU 2 transfers the texture address data, the color palette address data, and the polygon vertex address data to the display circuit 9.

The display circuit 9 establishes ranges of polygon surfaces (which ranges are surrounded by straight lines interconnecting the vertexes of the polygons) in the display buffer 10 based on the polygon vertex address data, and then reads those texture address data and color palette address data which correspond to the polygon vertex address data, based on the texture address data and the color palette address data stored in the RAM 4. The CPU 2 then writes the read the texture address data and color palette address data into the established ranges. This process is generally referred to as "texture mapping". In this manner, the display buffer 10 stores display image data of the object. The display circuit 9 then outputs the display image data from the display buffer 10 to the monitor TV. The monitor TV then displays on its display screen an image based on the display image data from the display buffer 10.

Outline of Volleyball Game:

When the game program stored in the ROM 3 is loaded into the RAM 4 and the CPU 2 executes the game program, the volleyball video game system supplies the volleyball video game to the game player or players.

Figure 2:
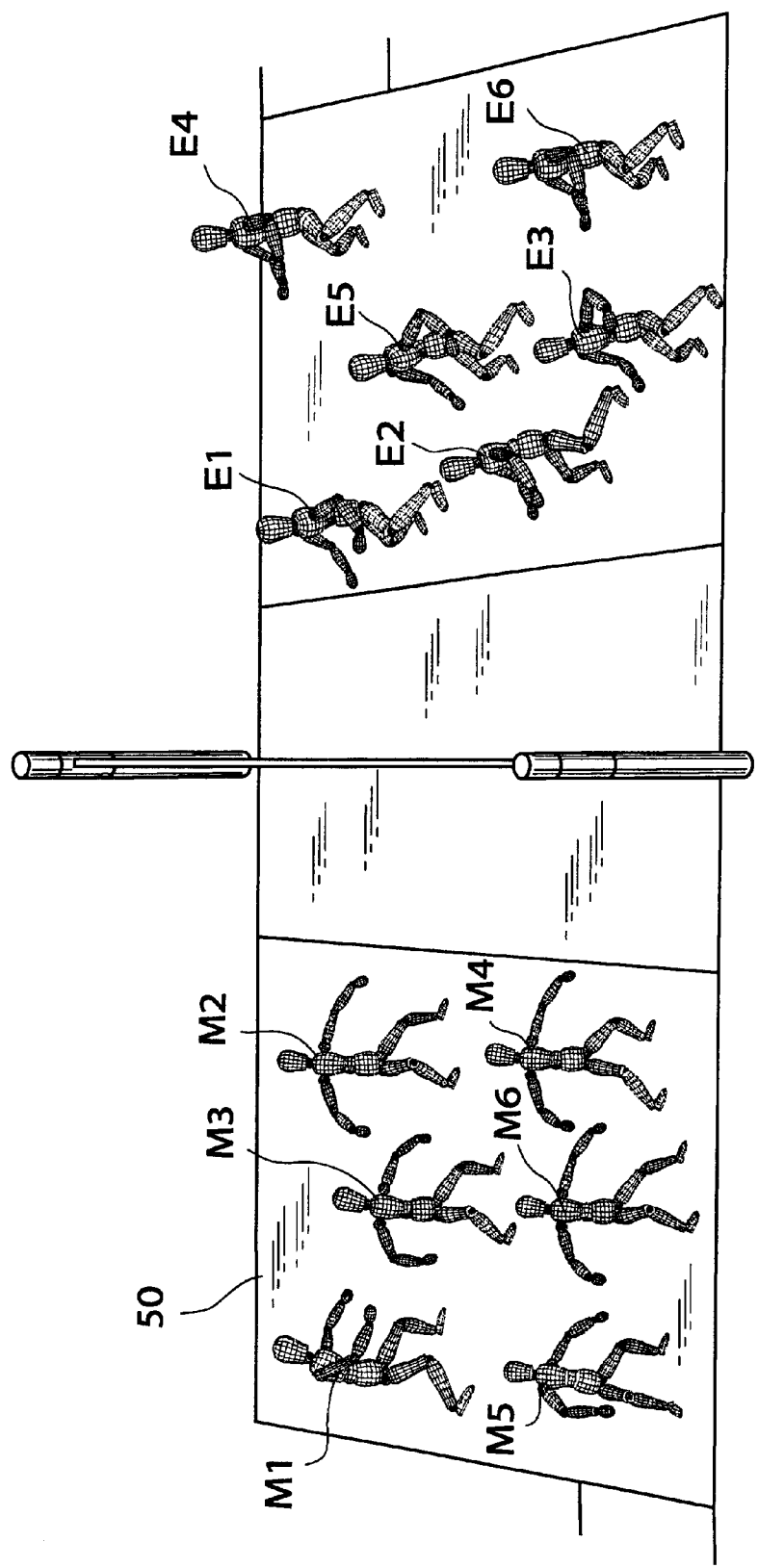
FIG. 2 is a view showing a virtual volleyball court and player characters displayed on a television monitor by the video game machine.

Specifically, the volleyball video game system displays a volleyball court in a virtual three-dimensional game space on the display screen of the monitor TV. More specifically, as shown in FIG. 2, a volleyball court 50 as viewed from an upper position alongside of a sideline is displayed on the display screen of the monitor TV. The volleyball video game system also displays two volleyball teams for playing a volleyball match on the volleyball court 50 on the display screen of the monitor TV. For example, a volleyball team M is displayed on a left-hand side of the volleyball court 50, and a volleyball team E is displayed on a right-hand side of the volleyball court 50, as shown in FIG. 2.

Player characters M1–M6 (collectively referred to as a player character M) of the volleyball team M are controlled by the game player or one of the game players, and player characters E1–E6 (collectively referred to as a player character E) of the volleyball team E are controlled by the CPU 2 or the other game player.

The volleyball video game performed by the volleyball video game system is governed by the actual volleyball rules. Therefore, the volleyball team which first wins three sets each with 15 points wins the volleyball video game.

Control Panel Operation

Operation of the control panel CP to control player characters will be described below with reference to FIGS. 3 through 6. FIGS. 3 through 6 are illustrative of the manner in which the control panel CP is operated to control player characters in receiving, attacking, and blocking actions. If the volleyball video game system is played by a single game player, the game player may use either the first control system C1 or the second control system C2. The first control system C1 and the second control system C2 can be operated in exactly the same manner as each other, regardless of whether it is operated to control the player characters M1–M6 or the player characters E1–E6. Operation of the first control system C1 will be described below, with the second control system C2 referred to when necessary.

When the game player uses the first control system C1, the game player controls the player characters M1–M6. The player characters M1–M6 are controlled basically in four actions, i.e., a serving action, a receiving action, an attacking (spiking) action, and a blocking action. Setting the ball with a player character as a setter and rotating the player characters are automatically carried out by the CPU 2. However, setting the ball and rotating the player characters may also be carried out by the game player.

For controlling a serving action, either one of the first buttons C1a–C1c of the first control system C1 is assigned as a serve button. Each of the player characters M1–M6 is basically to make a float serve when it is a server, and the CPU 2 automatically sets the ball B (see FIGS. 3–6) for the server. If the game player presses the serve button with good timing when the ball B is set, the player character M as the server hits the ball B into the other team's court section. The speed, path, and landing position of the ball B are determined by the timing with which the game player presses the serve button. If the game player does not press the serve button, the player character M as the server misses the set ball B.

Figure 3:
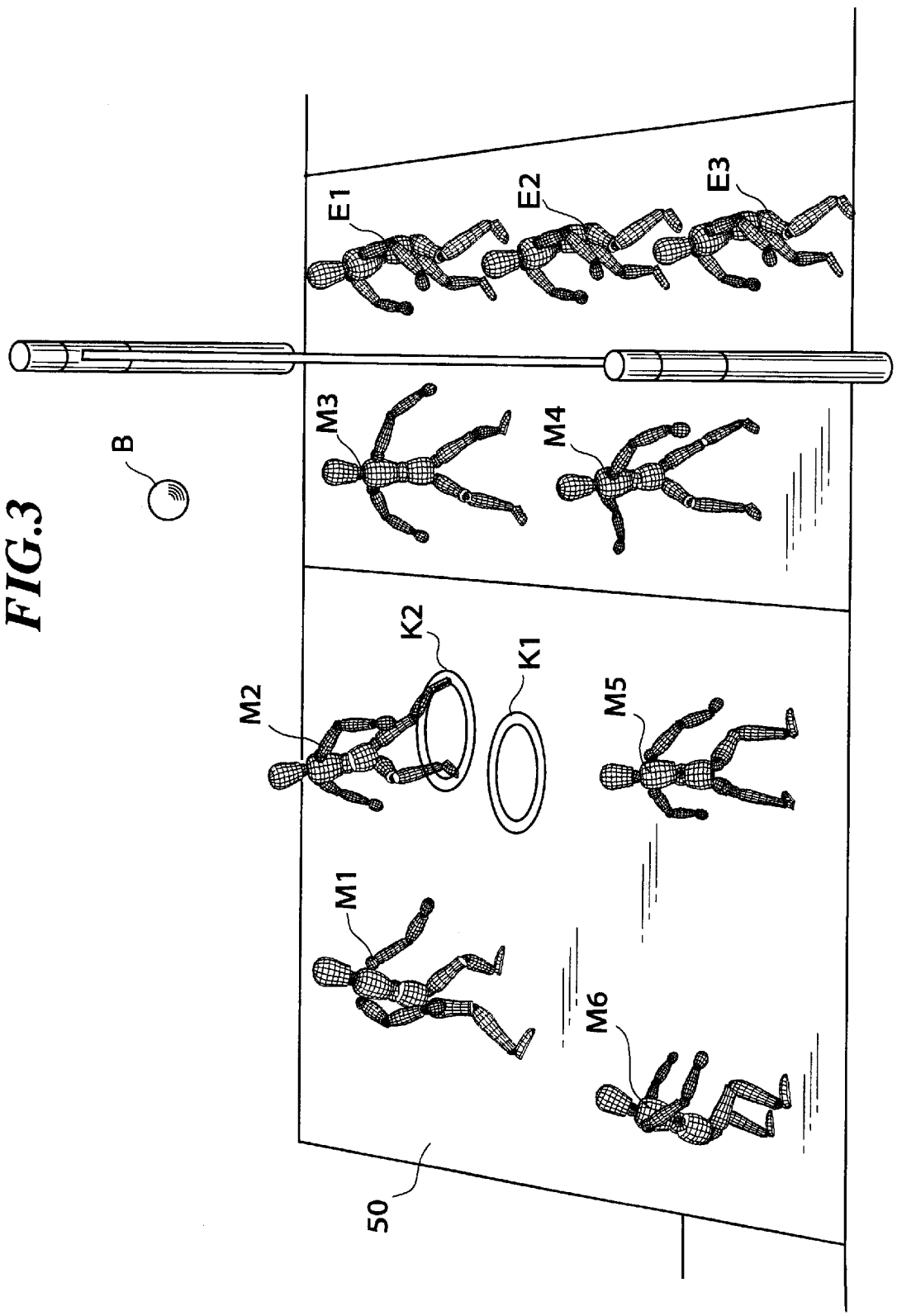
FIG. 3 is a view illustrative of the manner in which a control panel is operated to control player characters in a receiving action.

A receiving action is performed as follows: When the player character as the server of the other team hits the set ball B in a serving action, the landing position of the ball B is determined. Then, as shown in FIG. 3, a first circular cursor K1 indicative of the landing position of the ball B is displayed on the monitor TV. The CPU 2 then determines one of the player characters M1–M6 which is most appropriately positioned to receive the serve, e.g., the player character M closest to the first cursor K1, i.e., the player character M2 in FIG. 3, and displays a second circular cursor K2 around the feet of the determined player character M2.

Figure 4:
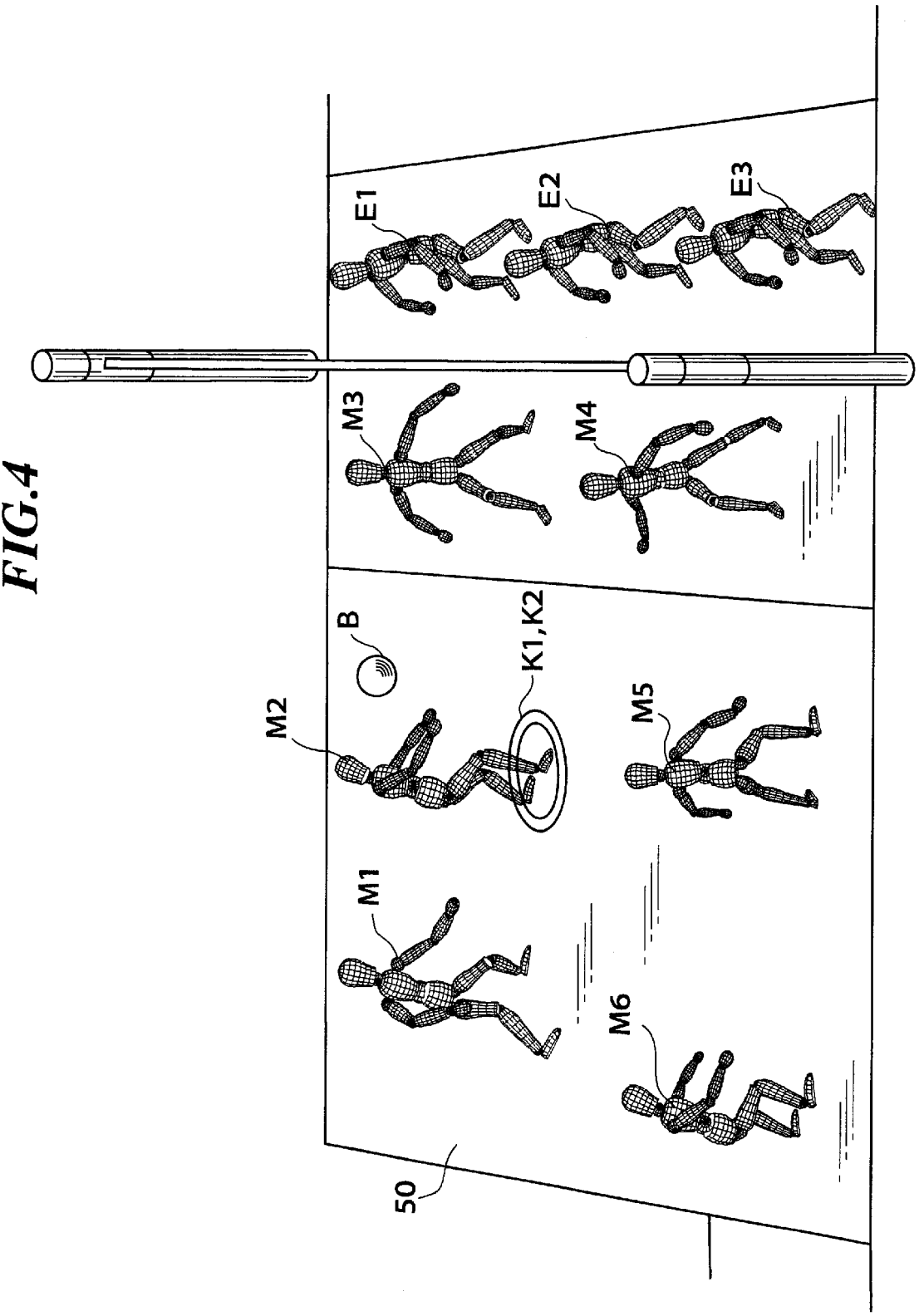
FIG. 4 is a view illustrative of the manner in which the control panel is operated to control player characters in the receiving action.

The determined player character M2 is now controllable by the game player with the first lever L1. When the game player moves the player character M2 toward the first cursor K1, the second cursor K2 also moves with the player character M2. When the second cursor K2 reaches a certain distance from the first cursor K1 before the ball B arrives at the landing position, the player character M2 becomes uncontrollable, and then, as shown in FIG. 4, the player character M2 automatically moves onto the first cursor K1, and the second cursor K2 is fully superposed on the first cursor K1. The player character M2 automatically receives the ball B as it flies to the landing position. The received ball B then moves toward a player character as a setter, e.g., the player character M4 in FIG. 3.

An attacking action is performed as follows: When the ball B is received by the player character as the setter, e.g., the player character M4, three player characters M other than the player character M4 are selected, e.g., two player characters M from the front row and one player character M from the back row. The first buttons C1a–C1c are assigned as attack buttons to the respective selected three player characters.

Figure 5:
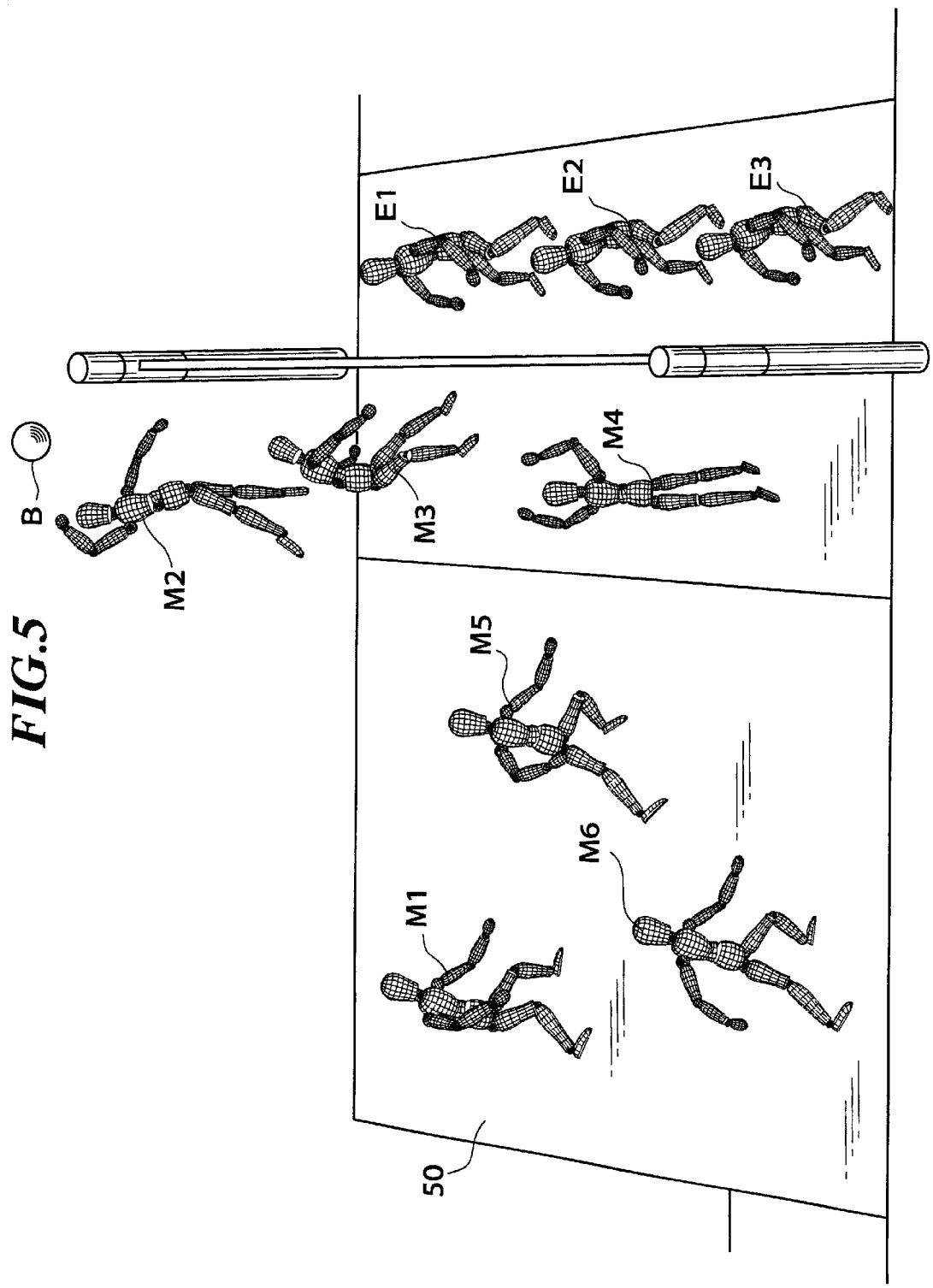
FIG. 5 is a view illustrative of the manner in which the control panel is operated to control player characters in an attacking action.

When the game player then presses either one of the first buttons C1a–C1c, as shown in FIG. 5, the player character M corresponding to the pressed attack button, e.g., the player character M2, starts an approach run. When the ball B reaches the setter, i.e., the player character M4 in FIG. 5, the player character M4 automatically sets the ball B. The player character M2 then attacks the ball B. The path and landing position of the attacked ball B vary depending on the timing with which the attack button is pressed.

When the setter, i.e., the player character M4 in FIG. 5, sets the ball B, the ball B changes its color for a predetermined period of time. When the game player presses either one of the first buttons C1a–C1c while the color of the ball B is being changed, the attacker or the player character M2 attacks the ball B in a manner depending on the pressed button. Specifically, if the game player presses the first button C1a, then the player character M2 hits the ball B with a normal strength of power. If the game player presses the first button C1b, then the player character M2 hits the ball B with a greater strength of power. If the game player presses the first button C1c, then the player character M2 makes a tipping action, i.e., returns the ball B slowly to the other team's court section.

When the game player presses plural ones of the first buttons C1a–C1c successively before the ball B reaches the setter, i.e., the player character M2, the player characters M to which the first buttons C1a–C1c have been assigned engages in a combination play. Specifically, if the game player presses all the first buttons C1a–C1c successively, the player characters M start their approach runs in the sequence in which the first buttons C1a–C1c are pressed. The setter sets the ball B for the player character M corresponding to the last pressed first button. The player characters M corresponding to the first buttons which have been pressed first and second, respectively, fake spiking the ball B, and the player character M corresponding to the last pressed first button attacks the ball B.

The combination play may be available in a two-player combination play mode or a three-player combination play mode depending on the number of first buttons pressed before the ball B reaches the setter. The sequence in which the player characters M engage in a combination play varies depending on the sequence in which the game player presses the first buttons C1a–C1c. In FIG. 5, the first button corresponding to the player character M3, e.g., the first button C1a, and the first button corresponding to the player character M2, e.g., the first button C1b, are successively pressed in the order named for thereby causing the player character M3, M2 to engage in the two-player combination play mode.

Figure 6:
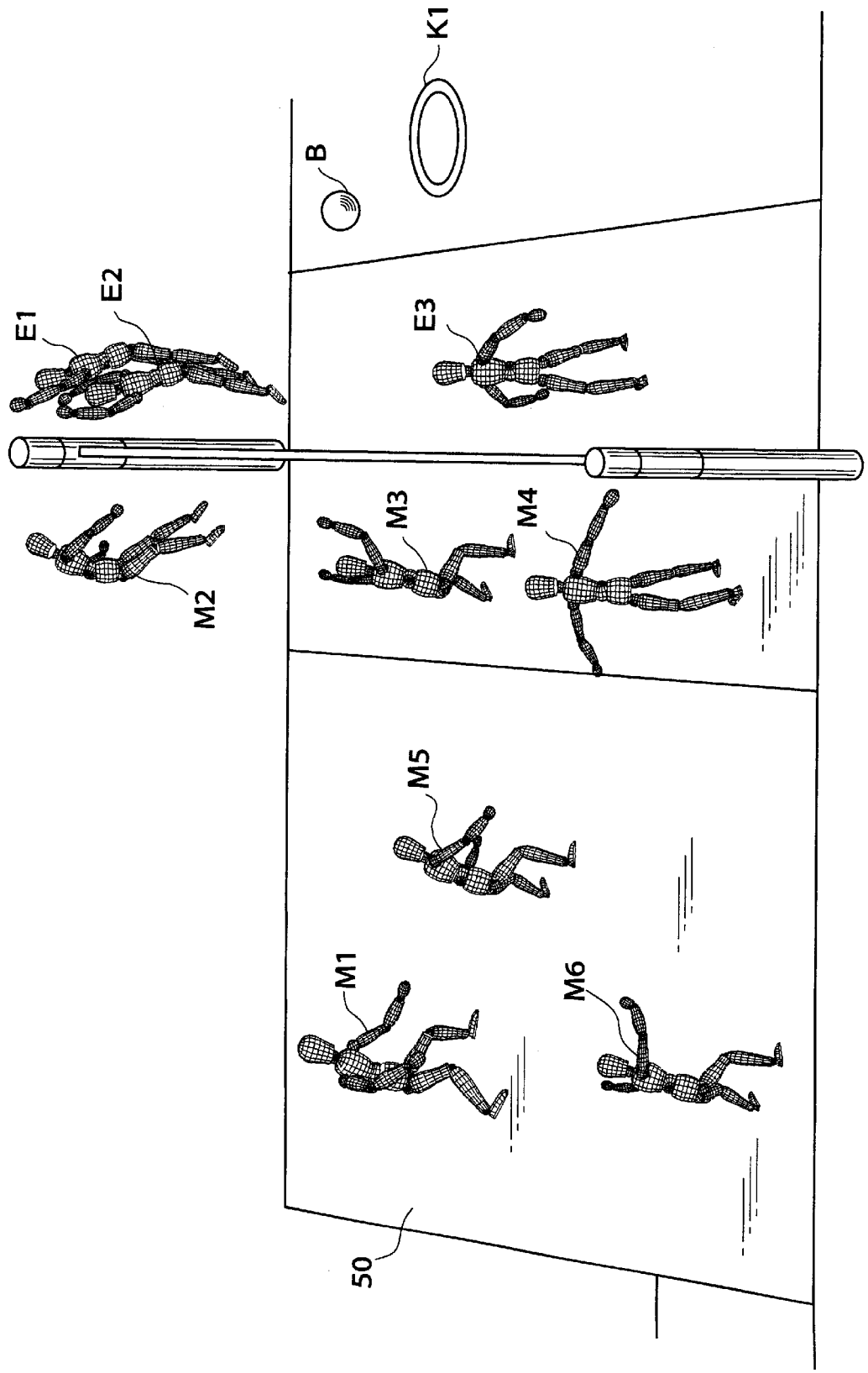
FIG. 6 is a view illustrative of the manner in which the control panel is operated to control player characters in a blocking action.

A blocking action is performed as follows: When the ball B is set by the setter, the ball B changes its color for a predetermined period of time, as described above. At this time, as shown in FIG. 6, the second buttons C2a–C2c of the second control system C are assigned respectively to the player characters in the front row of the other team, e.g., the player characters E1–E3 in FIG. 6. When the game player presses some or all of the second buttons C2a–C2c, the player characters corresponding to the pressed second buttons perform a blocking action.

Specifically, if the game player presses two of the second buttons C2a–C2c, then the two player characters corresponding to the pressed second buttons perform a blocking action. If the game player presses all the three second buttons C2a–C2c, then the three player characters E1–E3 perform a blocking action. In this manner, a two-player or three-player blocking action is performed depending on the number of second buttons C2a–C2c which are pressed.

FIG. 6 shows the manner in which the player characters E1, E2 engage in a blocking action. Whether or not the blocking action succeeds or not depends on the timing with which the game player presses the second buttons C2a–C2c. While a blocking action using the second control system C2 has been described above, a blocking action can also be performed using the first control system C1.

Figure 7:
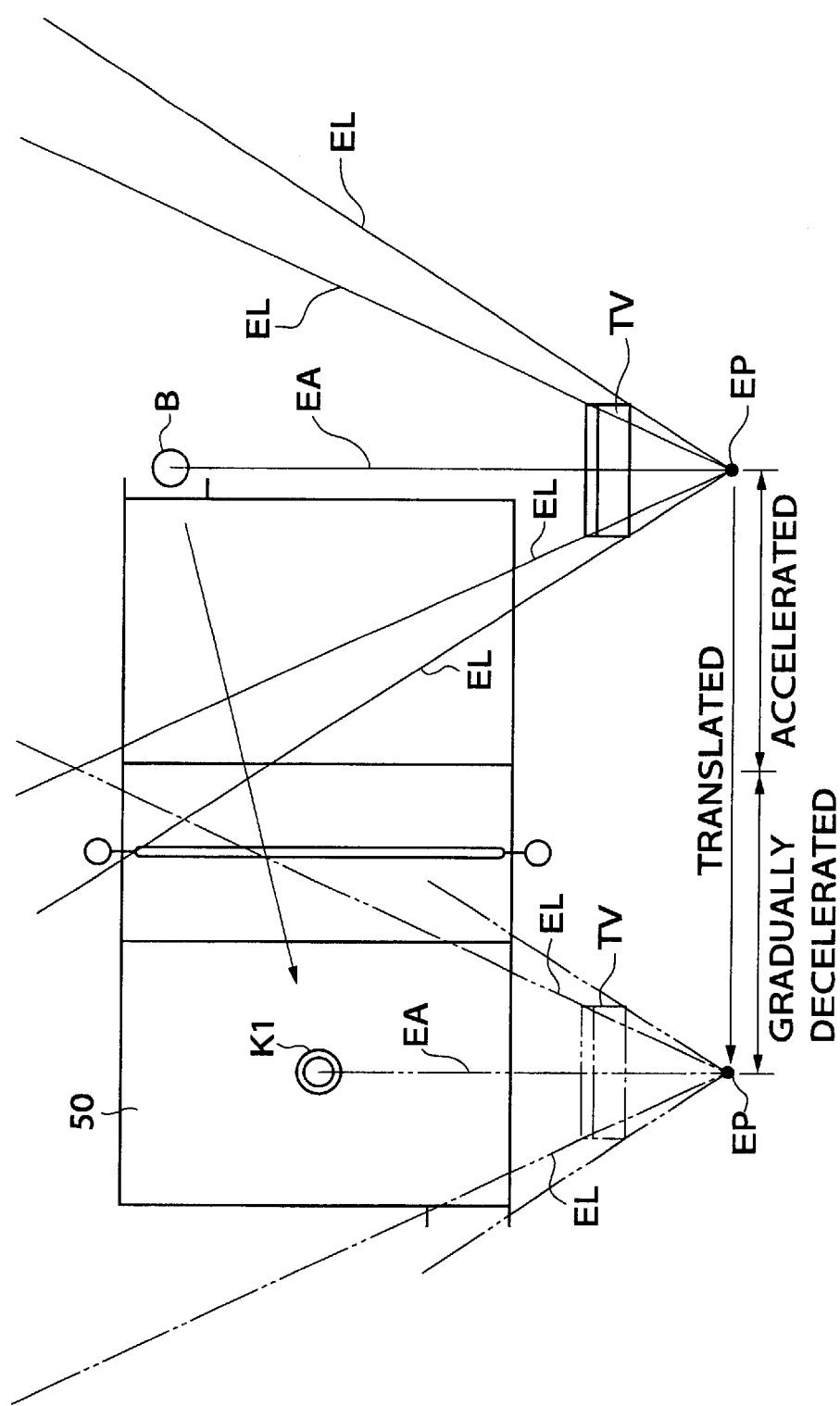
FIG. 7 is a view illustrative of the position of a viewpoint of the video game machine.

Viewpoint Position of Volleyball Video Game System:

The volleyball video game system changes the position of the viewpoint (camera position) depending on the position of the ball B to display a portion of the volleyball court 50 (see FIG. 2) on the display screen of the television monitor TV. FIG. 7 shows the manner in which the position of the viewpoint is changed.

FIG. 7 shows the volleyball court 50 as viewed directly from above and a viewpoint EP (camera position) with respect to the volleyball court 50. The viewpoint EP has its axis EA directed at all times such that a vertical plane containing the axis EA extends perpendicularly to extensions of sidelines of the volleyball court 50, i.e., parallel to the net. When the ball B is fixed, the axis EA and the center of the ball B are positioned on the same plane. There is established a rectangular plane which is positioned more closely to the viewpoint EA than the sideline of the court 50, has its vertexes on lines EL of sight from the viewpoint EP, and lies perpendicularly to the axis EA. The portion of the volleyball court 50 that is displayed on the display screen of the television monitor TV is the court 50 projected onto the rectangular plane thus established. When the ball B moves along the sidelines as a result of a serving action, the viewpoint EP also moves parallel to the sidelines. Since a visible range determined on the viewpoint EP and the axis EA is thus changed, the court 50 as it is displayed on the monitor TV is relatively moved.

The viewpoint EP moves based on the landing position of the ball B. Specifically, when the ball B is hit by a serving action, the landing position of the ball B is determined, and the first cursor K1 is displayed at the landing position. If the ball B is served from a service area on the right-hand side of the court 50 in FIG. 7 and landed on the first cursor K1 in a left-hand court section, the viewpoint EP moves to the left after the serving action. At this time, the viewpoint EP is accelerated at a speed higher than the speed of the ball B until the axis EA and the midpoint of a straight line interconnecting the center of the ball B at the position from which the ball B starts to move and the center of the first cursor K1 are positioned in the same plane, and thereafter is gradually decelerated and stopped when the axis EA and the center of the first cursor K1 are positioned in the same plane. After the viewpoint EP is stopped, the ball B shows up on the display screen of the monitor TV.

Figure 8:
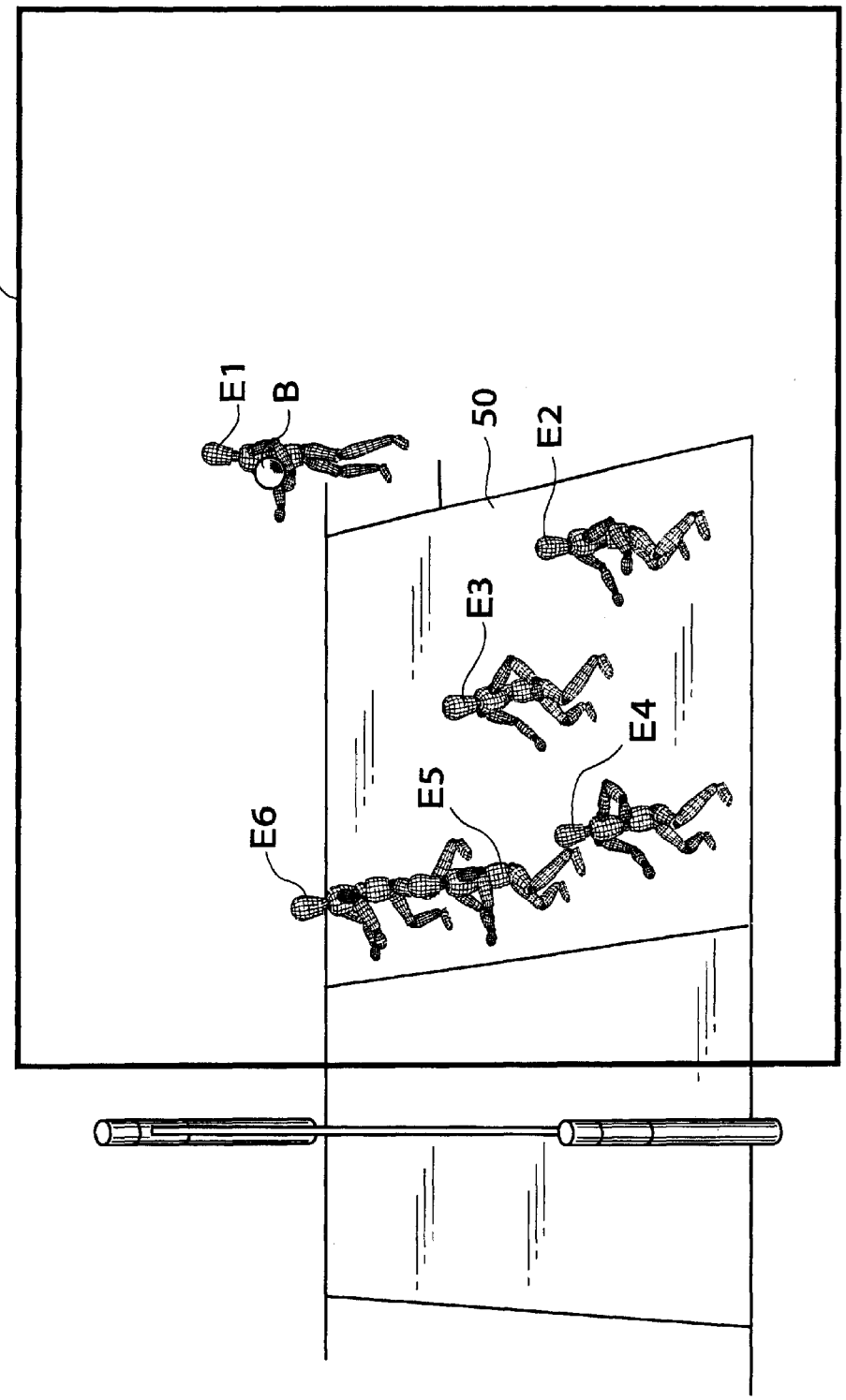
FIG. 8 is a view showing an volleyball game image displayed on the television monitor.
Figure 9:
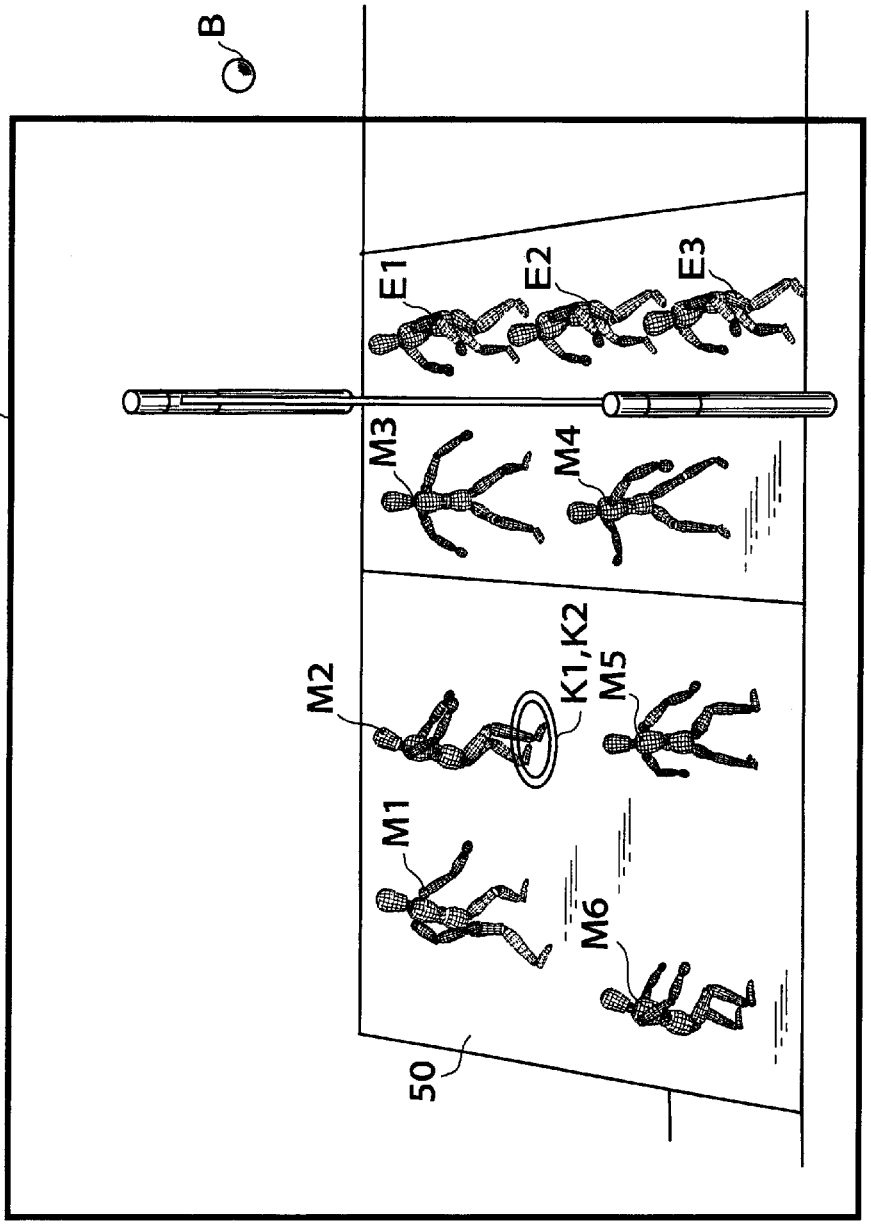
FIG. 9 is a view showing another volleyball game image displayed on the television monitor.
Figure 10:
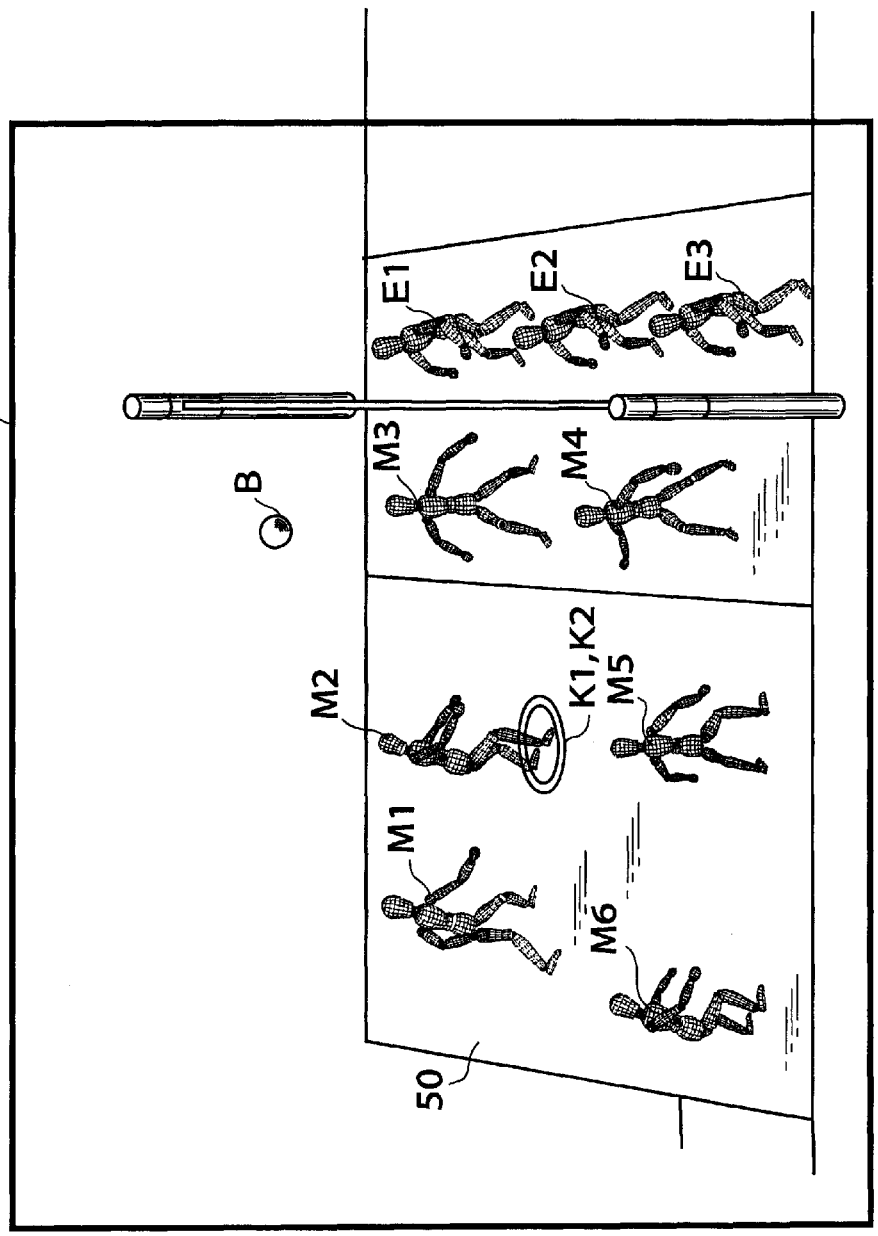
FIG. 10 is a view showing still another volleyball game image displayed on the television monitor.

FIG. 8 shows a volleyball game image displayed on the monitor TV before the viewpoint EP is in the position from which the ball B starts to move, as shown in FIG. 7. FIG. 9 shows a volleyball game image displayed on the monitor TV immediately after the viewpoint EP is stopped after having moved, as shown in FIG. 7. FIG. 10 shows a volleyball game image displayed on the monitor TV when the ball B shows up in the volleyball game image shown in FIG. 9.

Figure 11:
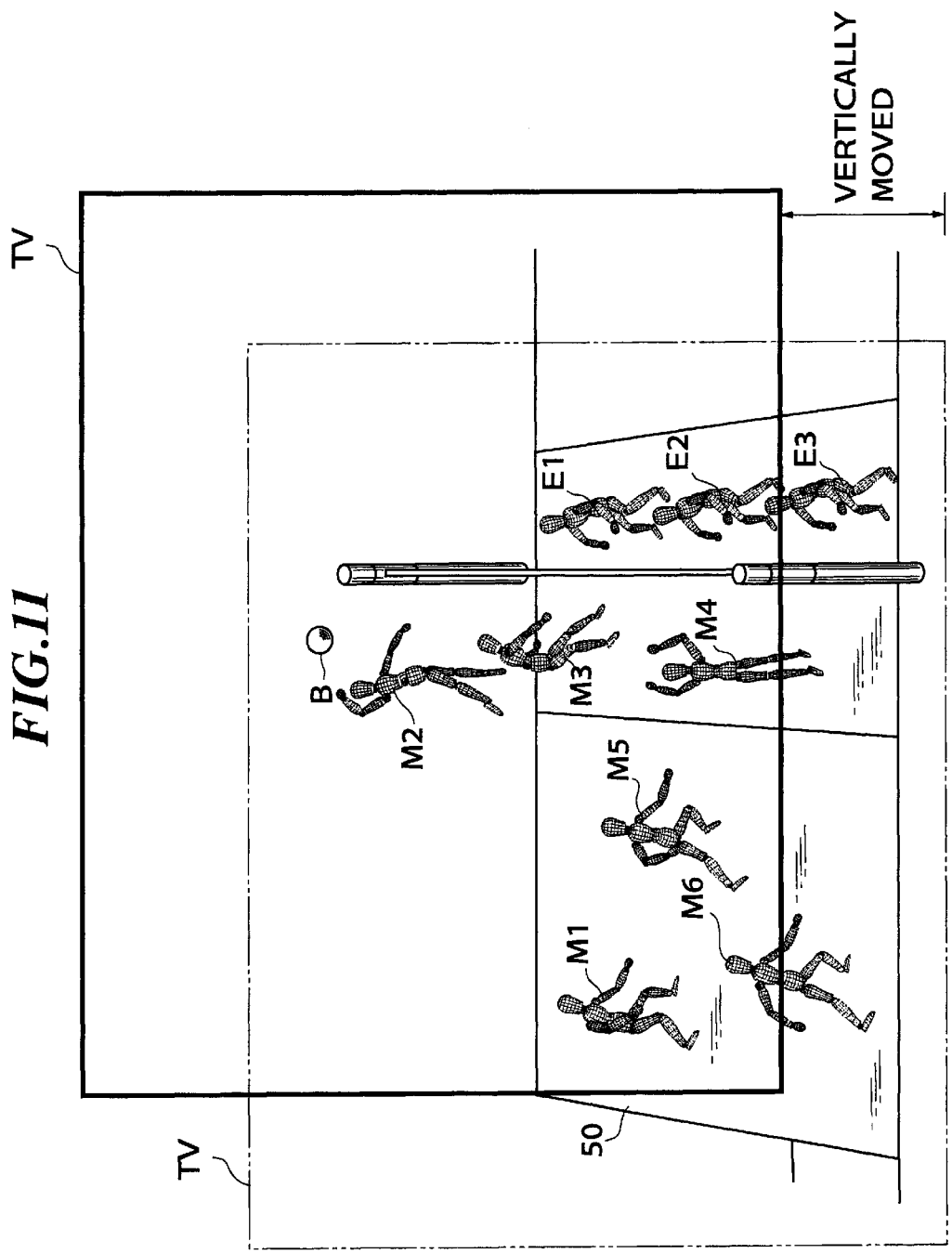
FIG. 11 is a view showing yet still another volleyball game image displayed on the television monitor.

As shown in FIG. 11, the viewpoint EP moves upwardly if the ball B would otherwise disappear off the monitor screen of the monitor TV from an upper edge thereof. In FIGS. 8–11, the area actually displayed on the monitor screen of the monitor TV is indicated as being surrounded by a rectangular frame which represents the monitor screen of the monitor TV.

Processing Operation of Volleyball Video Game System:

Processing operation of the volleyball video game system when it plays volleyball will be described below. After the CPU 2 has initialized the audio circuit 8, the display circuit 9, and the video game assembly 9, as described above, the CPU 2 executes the game program to display a startup image (not shown) on the monitor TV. Then, the CPU 2 displays the characters "INSERT COIN" on the monitor TV, prompting the game player to insert a coin into the coin insertion slot CH.

When a coin is inserted into the coin insertion slot CH, the CPU 2 detects the number of inserted coins, i.e., a credit number, and displays the credit number. If one coin is inserted, then the CPU 2 displays the characters "PRESS 1P BUTTON" on the monitor TV. If two or more coins are inserted, then the CPU 2 displays the characters "PRESS 1P OR 2P BUTTON" on the monitor TV.

When the game player presses the start button SL or the start button ST, a volleyball game in a one-player (player vs. CPU) mode starts. When the game player presses the start button SL and the start button ST, a volleyball game in a two-player (player vs. layer) mode starts.

Prior to the start of a volleyball game, tables 4a, 4b shown in FIGS. 12A and 12B are generated in the PAM 4. The tables 4a, 4b are used when a receiving action is performed and the viewpoint EP is moved. FIG. 12A shows the table 4a which is used in the two-player mode, and FIG. 12B shows the table 4b which is used in the one-player mode.

As shown in FIG. 12A, the table 4a stores landing positions and arrival times of the ball B in relation to the information of timing (timing information) with which the ball B is hit in response to an operation of the game player. The timing information represents timing with which the serve button and the attack buttons are pressed. Specifically, if a player character M or E engages in a serving action, then the timing information represents a time spent after the player character M or E as a server throws the ball B until either one of the first buttons C1a–C1c or the second buttons C2a–C2c, assigned as a serve button, is pressed. If a player character M or E engages in an attacking action, then the timing information represents a time spent after the ball B is received by the player character M or E until either one of the first buttons C1a–C1c or the second buttons C2a–C2c, assigned as an attack button, is pressed.

The table 4b stores landing positions and arrival times of the ball B in relation to random numbers which the CPU 2 detects from a random number table (not shown).

The tables 4a, 4b shown in FIGS. 12A and 12B may be used as tables for the ball B that is hit by a serving action, and other tables for the ball B that is hit by an attacking action may be generated in the RAM 4. Tables storing landing positions of the ball B may be generated with respect to the respective player characters M or E.

A position table (not shown) storing positional data of the viewpoint EP, the ball B, the player characters M, and the player characters E is generated in the RAM 4. The positional data stored in the position table are updated from time to time by the CPU 2 or the display circuit 9. For example, the positional data stored in the position table are updated each time one frame of image data is processed.

Figure 13:
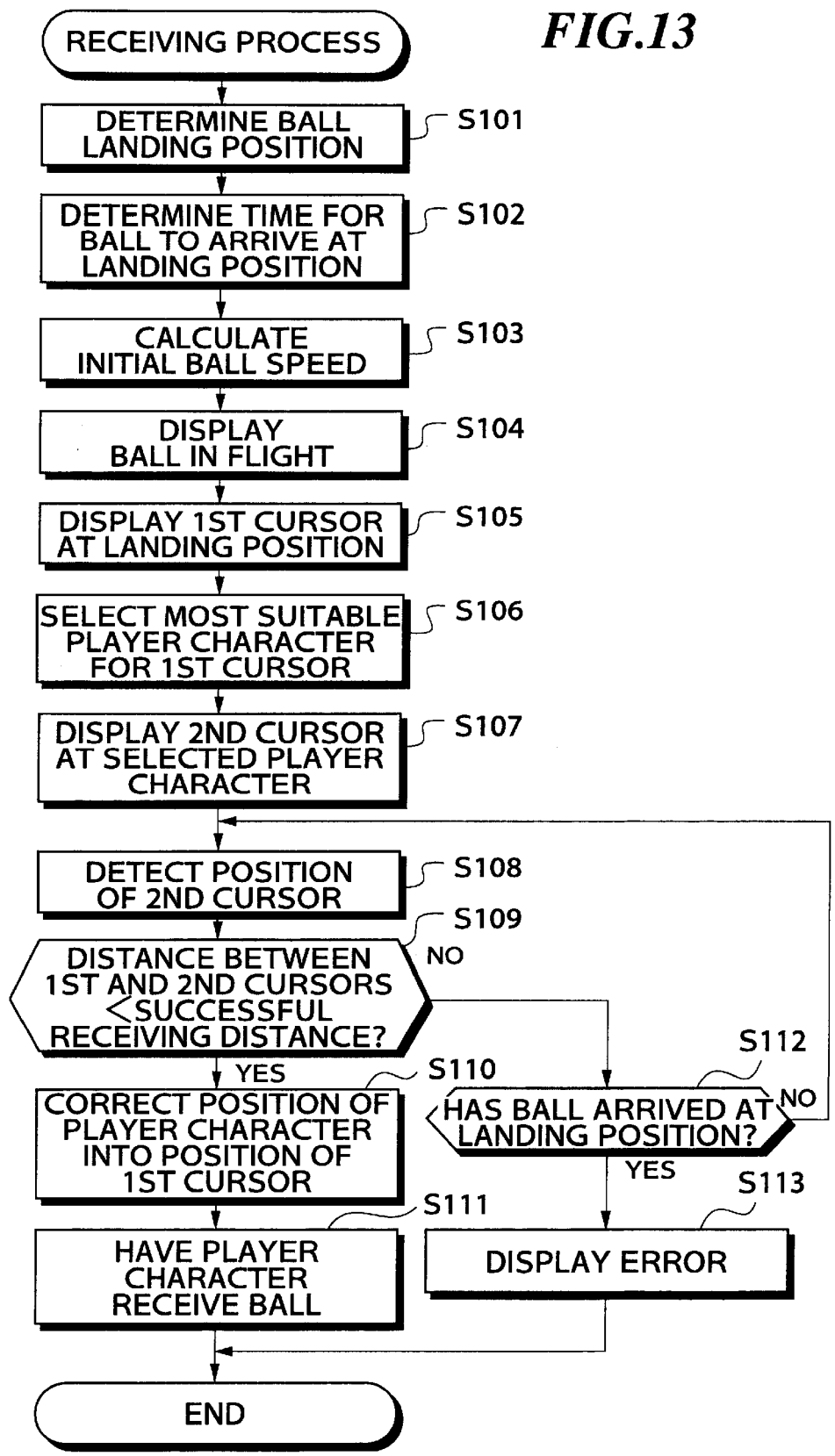
FIG. 13 is a flowchart of a processing sequence of a receiving process.

A receiving process carried out by the video game system while a volleyball game is being carried out will be described below. FIG. 13 shows a processing sequence of a receiving process. A receiving process is started when the ball B is hit by the other team. A receiving process in which the game player uses the first control system C1 to control the player characters M when the ball B is served by the volleyball team E will be described below.

The CPU 2 determines a landing position of the ball B served by the volleyball team E in step S101. Specifically, if the volleyball game is performed in the two-player mode, then the CPU 2 acquires timing information (time) based on a serve signal and an attack signal (both corresponding to input signals) which are received from the control panel CP through the interface 7, reads a landing position corresponding to the timing information from the table 4a (see FIG. 12A), and determines the read landing position as a landing position of the served ball B. If the volleyball game is performed in the one-player mode, the CPU 2 randomly detects a random number form the random number table, reads a landing position corresponding to the random number from the table 4b (see FIG. 12B), and determines the read landing position as a landing position of the served ball B. Thereafter, control goes to step S102.

In step S102, the CPU 2 reads an arrival time corresponding to the landing position determined in step S101 from the table 4a or 4b. Thereafter, control goes to step S103.

In step S103, the CPU 2 calculates an initial ball speed at which the ball B can reach the landing position within the arrival time read in step S102. Thereafter, control goes to step S104.

In step S104, the CPU 2 controls the ball B to fly at the initial speed read in step S103. Specifically, the CPU 2 displays the ball S104 in flight at the initial speed read in step S103 on the monitor TV. Thereafter, control goes to step S105.

In step S105, the CPU 2 displays the first cursor K1 at the landing position determined in step S101, as shown in FIG. 3. Thereafter, control goes to step S106.

In step S106, the CPU 2 selects a most appropriate player character M with respect to the first cursor K1. For example, the CPU 2 calculates distances between the position of the first cursor K1 and the positions of the player characters M which are stored in the position table (not shown), and selects a player character M whose distance to the first cursor K1 is the shortest, as the most appropriate player character. Thereafter, control goes to step S107.

In step S107, the CPU 2 displays the second cursor K2 around the feet of the player character M selected in step S106. Thereafter, control goes to step S108.

In step S108, the CPU 2 assigns the first lever L1 to controlling the player character M selected in step S106, and detects the position of the second cursor K2. Thereafter, control goes to step S109.

In step S109, the CPU 2 decides whether or not the distance between the first cursor K1 and the second cursor K2 is smaller than a predetermined successful receiving distance stored in the RAM 4. If the distance between the first cursor K1 and the second cursor K2 is smaller than the predetermined successful receiving distance (YES in step S109), then control goes to step S110. If the distance between the first cursor K1 and the second cursor K2 is equal to or greater than the predetermined successful receiving distance (NO in step S109), then control goes to step S112.

In step S110, the CPU 2 fully superposes the second cursor K2 and the first cursor K1. The position of the player character M is thus corrected into the position of the first cursor K1, i.e., the landing position of the ball B. Thereafter, control goes to step S111.

In step S111, the CPU 2 causes the player character M positionally corrected into the landing position to receive the ball B. The ball B flying toward the landing position is received by the player character M, and then flies toward a player character M which will serve as a setter, as displayed on the monitor TV. After step S111, the receiving process comes to an end.

If control goes from step S109 to step S112, then the CPU 2 decides whether the ball B has reached the landing position or not. If the ball B has not reached the landing position (NO in step S112), then control goes back to step S108. If the ball B has reached the landing position (YES in step S112), then control goes to step S113.

In step S113, the CPU 2 displays an error of the game player on the monitor TV. After step S113, the receiving process comes to an end.

After step S113, if the volleyball team M, for example, has had the right to serve, then the CPU 2 transfers the right to serve to the volleyball team E. If the volleyball team E has had the right to serve, then the CPU 2 increments the number of points of the volleyball team E by "1". If the number of points of the volleyball team E reaches "15" when it has been incremented by "1", then the CPU 2 puts an end to the set. If the number of sets won by the volleyball team E reaches "3" when the CPU 2 puts an end to the set, then the CPU 2 puts an end to the volleyball game.

Figure 14:
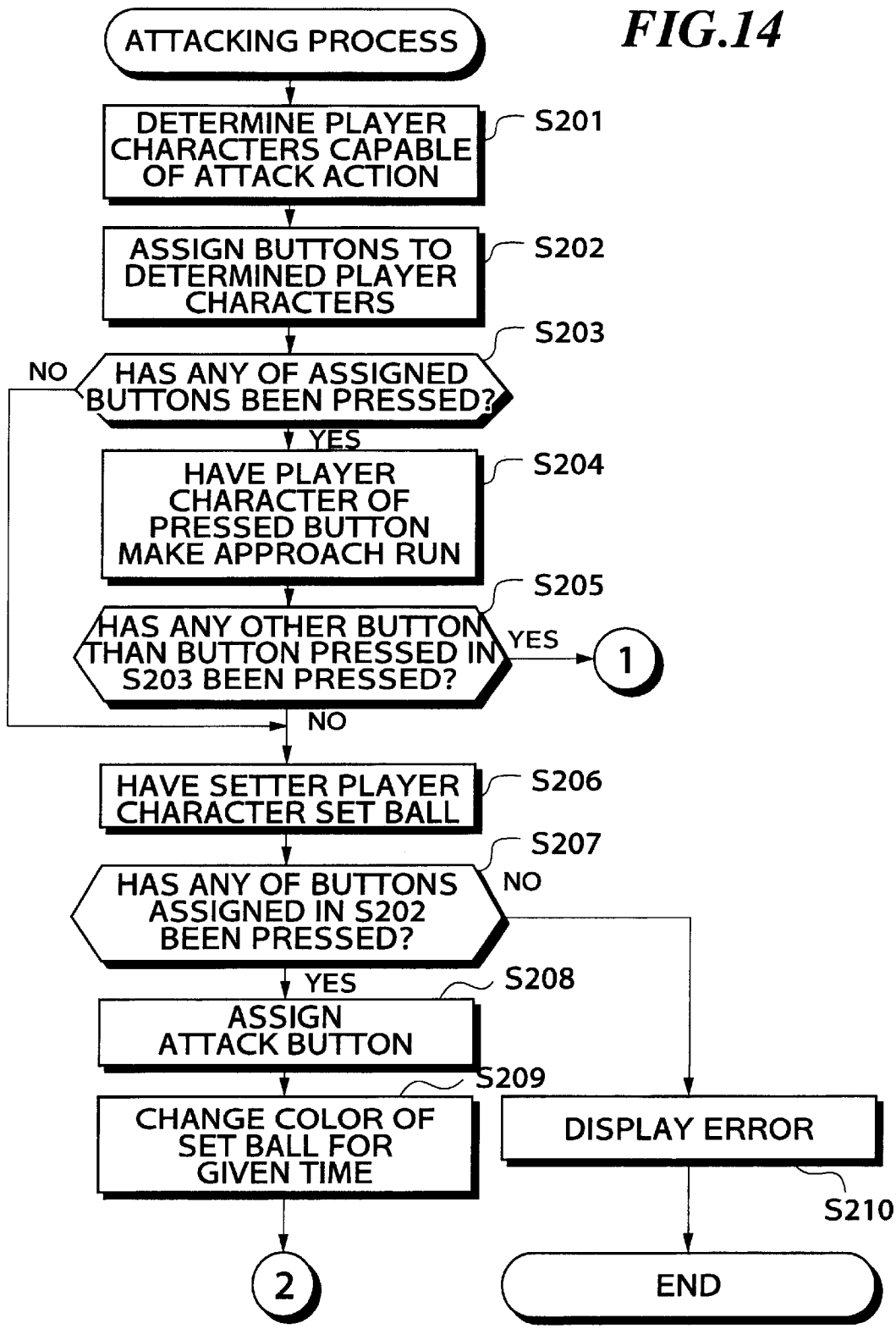
FIGS. 14 through 16 are a flowchart of a processing sequence of an attacking process.
Figure 15:
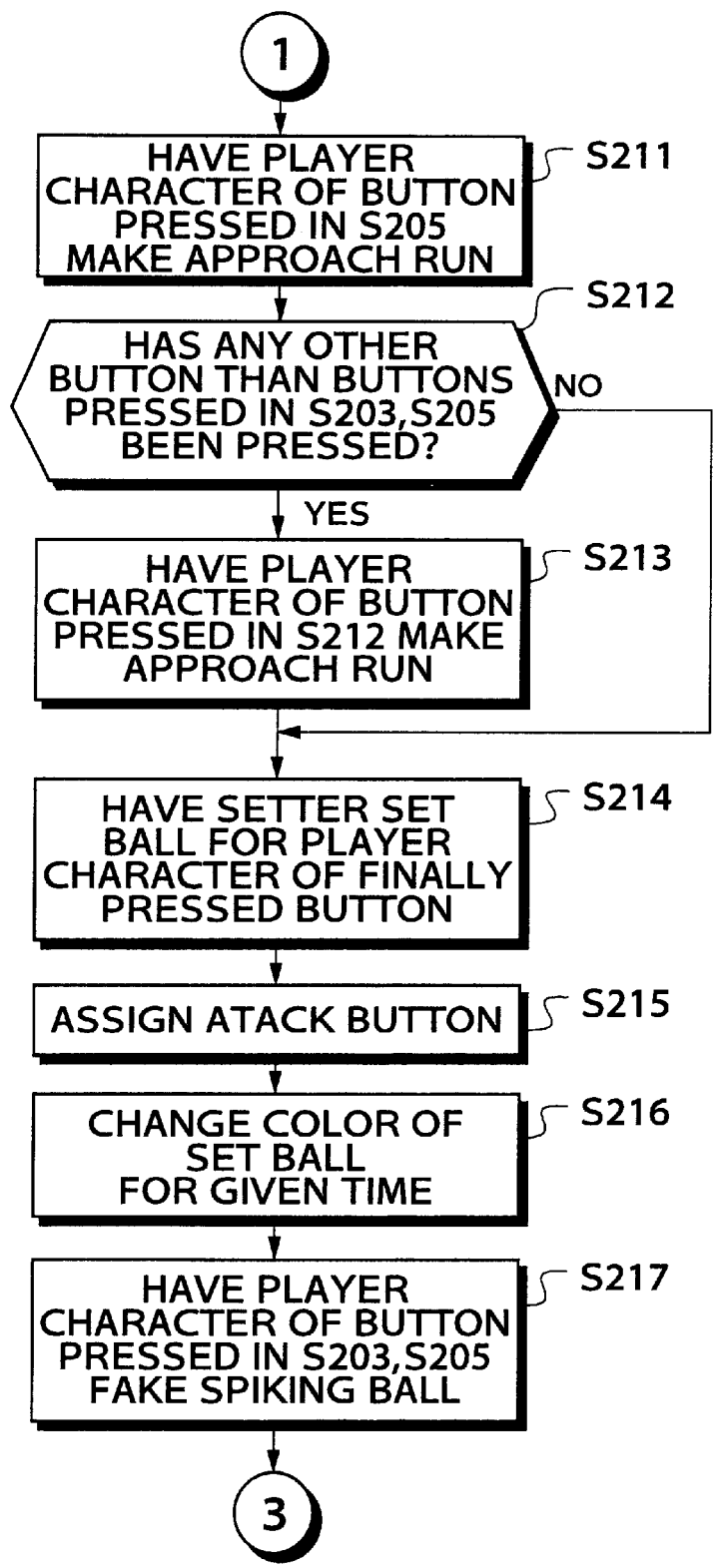
Figure 16:
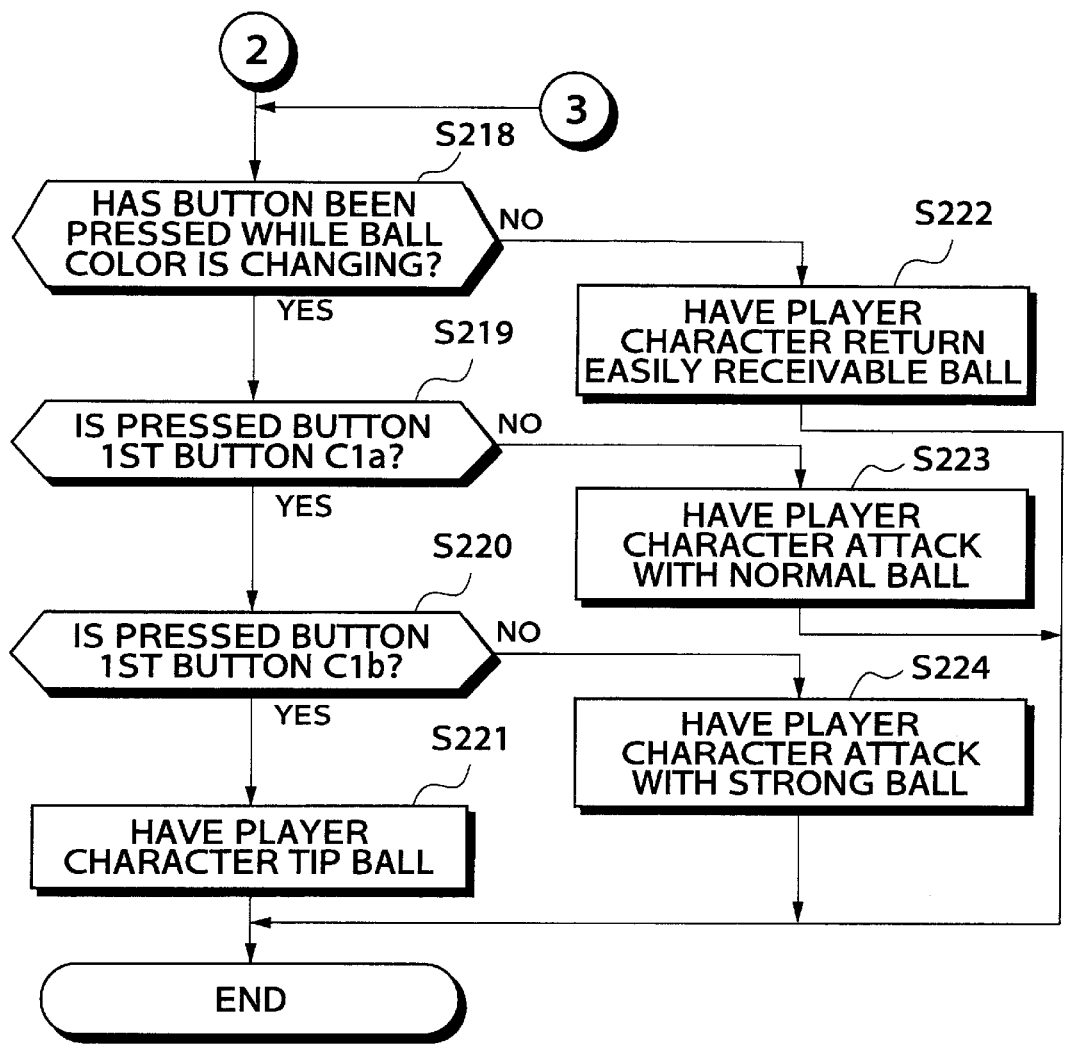

An attacking process carried out by the video game system while a volleyball game is being carried out will be described below. FIGS. 14–16 show a processing sequence of an attacking process. An attacking process is started when the ball B is received in step S111 shown in FIG. 13, for example. An attacking process in which the game player uses the first control system C1 to control the player characters of the volleyball team M to attack the ball B will be described below.

In step S201 shown in FIG. 14, the CPU 2 determines a plurality of player characters M, e.g., three player characters M, capable of engaging in an attacking action, from the player characters of the volleyball team M. Thereafter, control goes to step S202.

In step S202, the CPU 2 assigns the first buttons C1a–C1c respectively to the three player characters M determined in step S201, and is ready to receive input signals from the first buttons C1a–C1c through the interface 7. Thereafter, control goes to step S203.

In step S203, the CPU 2 decides whether either one of the first buttons C1a–C1c assigned in step S202 has been pressed or not before the received ball B reaches a player character M as a setter. If either one of the first buttons C1a–C1c has been pressed (YES in step S203), then the CPU 2 acquires timing information representing a time spent after the ball B has been received until the first button has been pressed, and stores the acquired timing information in the RAM 4. Thereafter, control goes to step S204. If either one of the first buttons C1a–C1c has not been pressed (NO in step S203), then control jumps to step S206.

If control goes from step S203 to step S204, then the CPU 2 causes the player character M to which the button decided as being pressed in S203 is assigned to make an approach run. Specifically, the CPU 2 displays the player character M as it makes an approach run on the monitor TV. The approach run is based on the timing information which the CPU 2 has acquired in step S203. Thereafter, control goes to step S205.

In step S205, the CPU 2 decides whether either one of the first buttons C1a–C1c, other than the button that has been decided as being pressed in step S203 before the received ball B reaches the player character M as the setter, has been pressed or not. If either one of the first buttons C1a–C1c has been pressed (YES in step S205), then the CPU 2 acquires timing information representing a time spent after the ball B has been received until the first button has been pressed, and stores the acquired timing information in the RAM 4. Thereafter, control goes to step S211 (see FIG. 15). If no first button has been pressed (NO in step S205), then control goes to step S206.

In step S206, the CPU 2 controls the player character M as the setter to set the ball B. Specifically, the CPU 2 displays the player character M as it sets the received ball B. Thereafter, control proceeds to step S207.

In step S207, the CPU 2 decides whether either one of the first buttons C1a–C1c assigned in step S202 has been pressed or not. If either one of the first buttons C1a–C1c has been pressed (YES in step S207), then control goes to step S208. If either one of the first buttons C1a–C1c has not been pressed (NO in step S207), then control goes to step S210.

If control goes to step S210, then the CPU 2 displays an error of the game player on the monitor TV. After step S210, the attacking process comes to an end.

After step S210, if the volleyball team M, for example, has had the right to serve, then the CPU 2 transfers the right to serve to the volleyball team E. Conversely, if the volleyball team E has had the right to serve, then the CPU 2 increments the number of points of the volleyball team E by "1". If the number of points of the volleyball team E reaches "15" when it has been incremented by "1", then the CPU 2 puts an end to the set. If the number of sets won by the volleyball team E reaches "3" when the CPU 2 puts an end to the set, then the CPU 2 puts an end to the volleyball game.

If control goes to step S208, then the CPU 2 assigns an attack button to any one of the first buttons C1a C1c. For example, the CPU 2 assigns attack buttons respectively to the first buttons C1a–C1c, and is ready to receive input signals from the attack buttons or the first buttons C1a–C1c through the interface 7. Thereafter, control goes to step S209.

In step S209, the CPU 2 changes the color of the ball B set in step S206 for a predetermined time. Thereafter, control goes to step S218 (see FIG. 16).

If control proceeds from step S205 to step S211 shown in FIG. 15, the CPU 2 causes the player character M corresponding to the button decided as being pressed in S205 to make an approach run. Specifically, the CPU 2 displays the player character M as it makes an approach run on the monitor TV. The approach run is based on the timing information which the CPU 2 has acquired in step S205. Thereafter, control goes to step S212.

In step S212, the CPU 2 decides whether any button, other than the buttons that have been decided as being pressed in steps S203, S205, has been pressed or not. If a button has been pressed (YES in step S212), then the CPU 2 acquires timing information representing a time spent after the ball B has been received until the button has been pressed, and stores the acquired timing information in the RAM 4. Thereafter, control goes to step S213. If no button has been pressed (NO in step S212), then control jumps to step S214.

In step S213, the CPU 2 causes the player character M corresponding to the button decided as being pressed in S212 to make an approach run. Specifically, the CPU 2 displays the player character M as it makes an approach run on the monitor TV. The approach run is based on the timing information which the CPU 2 has acquired in step S212. Thereafter, control goes to step S214.

In step S214, the CPU 2 controls the player character M as the setter to set the ball B for the player character M corresponding to the first button finally pressed in steps S201–S213. Specifically, the CPU 2 displays, on the monitor TV, the player character M as the setter which sets the ball B for the player character M corresponding to the button decided as being pressed in step S205 or for the player character M corresponding to the button decided as being pressed in step S212. Thereafter, control goes to step S215.

In step S215, the CPU 2 assigns an attack button to any one of the first buttons C1a–C1c. For example, the CPU 2 assigns attack buttons respectively to the first buttons C1a, C1b, and is ready to receive input signals from these attack buttons through the interface 7. Thereafter, control goes to step S216.

In S216, the CPU 2 changes the color of the ball B set in step S215 for a predetermined time. Thereafter, control goes to step S217.

In step S218, the CPU 2 controls the player character M corresponding to the button decided as being pressed in step S203 and/or step S205, to fake spiking the ball B. Specifically, the CPU 2 displays the corresponding player character M as it fakes spiking the ball B on the monitor TV. At this time, if the CPU 2 has decided that the buttons have been pressed in steps S203, S205, S212, then the CPU 2 displays the player characters M corresponding to the buttons decided as being pressed in steps S203, S205, as they fake spiking the ball B, on the monitor TV. If the CPU 2 has decided that the buttons have been pressed in steps S203, S205, then the CPU 2 displays the player character M corresponding to the button decided as being pressed in step S203, as it fakes spiking the ball B, on the monitor TV. In this manner, a two-player combination play mode or a threeplayer combination play mode is carried out. Thereafter, control proceeds from step S217 to step S218 shown in FIG.

In step S218, the CPU 2 decides whether either one of the first buttons C1a, C1b assigned as attack buttons has been pressed or not while the color of the ball B is changing. If either one of the first buttons C1a, C1b has been pressed (YES in step S218), then control goes to step S219. If either one of the first buttons C1a, C1b has not been pressed (NO in step S218), then control goes to step S222.

If control goes from step S218 to step S219, then the CPU 2 decides whether the button decided as being pressed in step S218 is the first button C1a or not. If the pressed button is the first button C1a (YES in step S219), then control goes to step S220. If the pressed button is not the first button C1a (NO in step S219), then control goes to step S223.

If control goes from step S219 to step S220, then the CPU 2 decides whether the button decided as being pressed in step S218 is the first button C1b or not. If the pressed button is the first button C1b (YES in step S220), then control goes to step S221. If the pressed button is not the first button C1b (NO in step S220), then control goes to step S224.

If control goes from step S220 to step S221, then the CPU 2 controls the player character M corresponding to the button finally pressed before the ball B reaches the setter, to tip the ball B. Specifically, the CPU 2 displays the corresponding player character M as it tips the ball B on the monitor TV. After step S221, the attacking process is brought to an end.

If control goes from step S218 to step S222, then the CPU 2 controls the player character M corresponding to the button finally pressed before the ball B reaches the setter, to return the ball B as an easily receivable ball. Specifically, the CPU 2 displays the corresponding player character M as it returns the ball B as a ball that can easily be received by a player character E in the court section of the volleyball team E. After step S222, the attacking process is brought to an end.

If control goes from step S219 to step S223, then the CPU 2 controls the player character M corresponding to the button finally pressed before the ball B reaches the setter, to attack the ball B with a normal strength of power to the court section of the volleyball team E. Specifically, the CPU 2 displays the corresponding player character M as it attacks the ball B with a normal strength of power on the monitor TV. After step S223, the attacking process is brought to an end.

If control goes from step S220 to step S224, then the CPU 2 controls the player character M corresponding to the button finally pressed before the ball B reaches the setter, to attack the ball B with a strong strength of power to the court section of the volleyball team E. Specifically, the CPU 2 displays the corresponding player character M as it attacks the ball B with a strong strength of power on the monitor TV. After step S224, the attacking process is brought to an end.

After the attacking process, the CPU 2 decides whether the attacked ball B touches the net. If the CPU 2 decides that the attacked ball B does not touch the net, then the CPU 2 executes a receiving action of the volleyball team E. If the CPU 2 decides that the attacked ball B touches the net, then the CPU 2 displays the ball B as it touches the net, and displays an error on the monitor TV. Then, the CPU 2 carries out a process resulting from the error.

Figure 17:
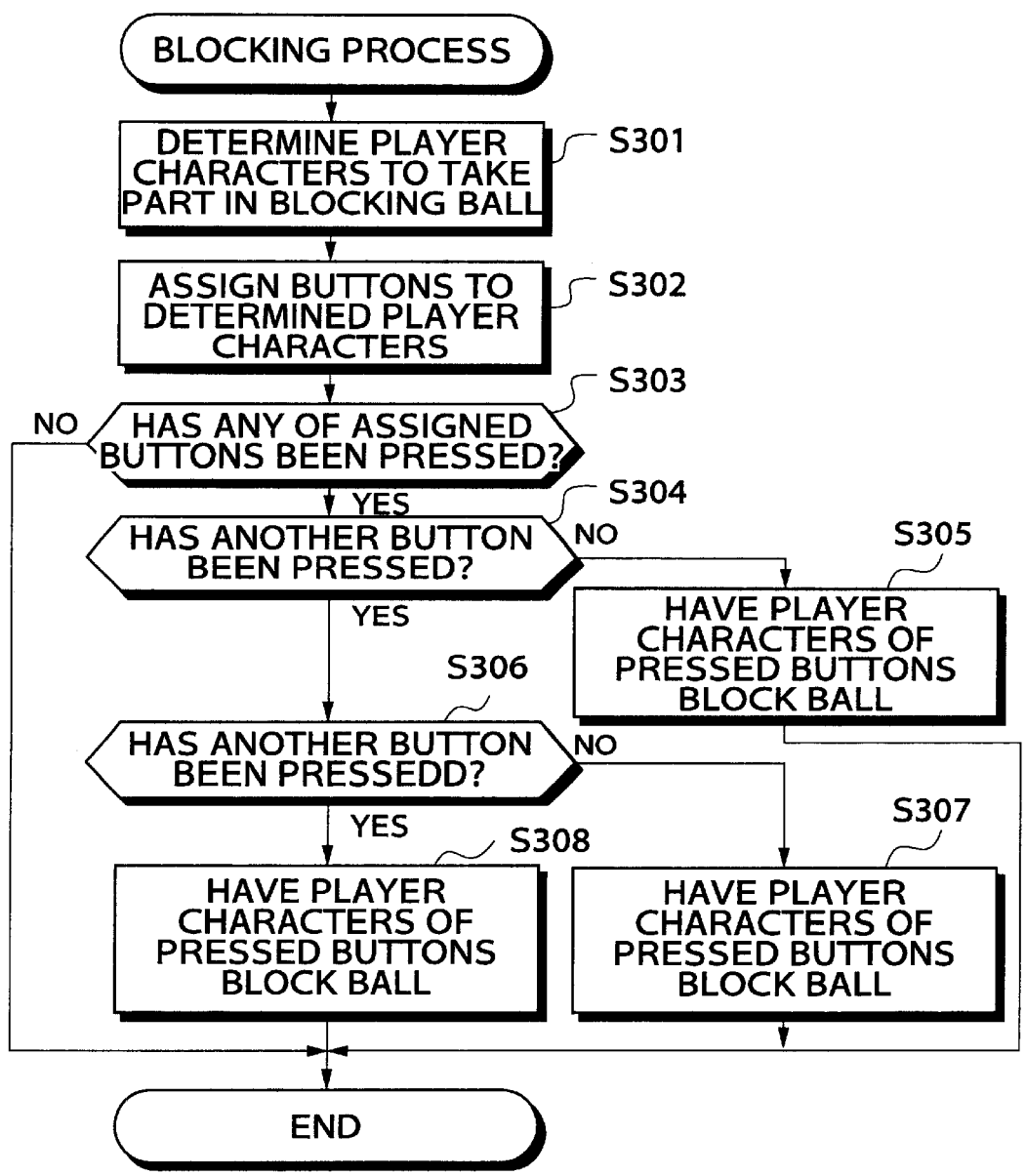
FIG. 17 is a flowchart of a processing sequence of a blocking process.

If the volleyball game is performed in the two-player mode, then the volleyball video game system carries out a blocking action by player characters (player characters E in this example) of the opponent's team (the volleyball team E in this example) concurrent with the above attacking process. FIG. 17 shows an processing sequence of a blocking process. A blocking process is started when the ball B set in step S209 or S216 in the attacking process changes its color.

In step S301 shown in FIG. 17, the CPU 2 determines a plurality of player characters E, e.g., three player characters M, which will be taking part in a blocking action, from the player characters of the volleyball team E. Thereafter, control goes to step S302.

In step S302, the CPU 2 assigns the second buttons C2a–C2c respectively to the three player characters E determined in step S301, and is ready to receive input signals from the second buttons C2a–C2c through the interface 7. Thereafter, control goes to step S303.

In step S303, the CPU 2 decides whether either o n e of the second buttons C2a–C2c assigned in step S302 has been pressed or not before the changing of the color of the ball B is finished. If either one of the second buttons C2a–C2c has been pressed (YES in step S303), then the CPU 2 acquires timing information representing a time spent after the ball B has started changing its color until the second button has been pressed, and stores the acquired timing information in the RAM 4. Thereafter, control goes to step S304. If either one of the second buttons C2a–C2c has not been pressed (NO in step S303), then the blocking process is ended, and control goes to a receiving process by the volleyball team E. If the volleyball game is performed in the two-player mode, then the receiving process by the volleyball team E is the same as the receiving process shown in FIG. 13.

If control proceeds from step S303 to step S304, then the CPU 2 decides whether a button, other than the button that has been decided as being pressed in step S303 before the changing of the color of the ball B is finished, has been pressed or not. If a button has been pressed (YES in step S304), then the CPU 2 acquires timing information representing a time spent after the ball B has started changing its color until the button has been pressed, and stores the acquired timing information in the RAM 4. Thereafter, control goes to step S306. If no button has been pressed (NO in step S304), then control goes to step S305.

If control goes from step S304 to step S305, then the CPU 2 controls those player characters E to which buttons decided as being pressed in step S303 are assigned, to block the ball B. Specifically, the CPU 2 displays the corresponding player characters E as they block the ball B on the monitor TV. The blocking action is based on the timing information which the CPU 2 has acquired in step S303. After step S305, the blocking action is ended. If the blocking action is successful, then control shifts to a receiving process, which is the same as the receiving process shown in FIG. 13, by the volleyball team M. If the blocking action is unsuccessful, then control shifts to a receiving process by the volleyball team E. If the blocked ball B goes out of bounds, then the CPU 2 displays an error and executes a process resulting from the error.

If control goes from step S304 to step S306, then the CPU 2 decides whether any button, other than the buttons that have been decided as being pressed in steps S303, S304, has been pressed or not. If a button has been pressed (YES in step S306), then the CPU 2 acquires timing information representing a time spent after the ball B has started changing its color until the button has been pressed, and stores the acquired timing information in the RAM 4. Thereafter, control goes to step S308. If no button has been pressed (NO in step S306), then control jumps to step S307.

In step S307, the CPU 2 controls the player characters E to which the buttons that have been decided as being pressed in steps S303, S304 are assigned, to perform a blocking action. Specifically, the CPU 2 displays the corresponding player characters E as they perform a two-player blocking action on the monitor TV. This blocking action is based on the timing information which the CPU 2 has acquired in steps S303, S304. After step S307, the blocking action is ended. Thereafter, the same process as effected after step S305 is carried out.

In step S308, the CPU 2 controls the player characters E to which the buttons that have been decided as being pressed in steps S303, S304, S306 are assigned, to perform a blocking action. Specifically, the CPU 2 displays the corresponding player characters E as they perform a three-player blocking action on the monitor TV. This blocking action is based on the timing information which the CPU 2 has acquired in steps S303, S304, S306. After step S308, the blocking action is ended. Thereafter, the same process as effected after step S305 is carried out.

A viewpoint changing process for changing the viewpoint (camera position) will be described below. FIG. 18 shows a processing sequence of a viewpoint changing process. A viewpoint changing process is started when a volleyball game start image as shown in FIG. 8 is displayed on the monitor TV.

In S401 shown in FIG. 18, the CPU 2 sets the viewpoint EP to the position of the ball B. At this time, the viewpoint EP is established such that the axis EA thereof will lie on the same plane as the center of the ball B. The CPU 2 then displays the volleyball game start image (see FIG. 8) with the viewpoint EP aligned with the ball B on the monitor TV. Then, control proceeds to step S402.

In step S402, the CPU 2 determines a landing position of the ball B. The processing in step S402 is the same as the processing in step S101 (see FIG. 13), and hence will not be described in detail below. Thereafter, control proceeds to step S403.

In step S403, the CPU 2 determines a time for the ball B to arrive at the landing position that has been determined in step S402. The processing in step S403 is the same as the processing in step S102 (see FIG. 13), and hence will not be described in detail below. Thereafter, control proceeds to step S404.

In step S404, the CPU 2 calculates an intermediate position between the present position of the ball B stored in the position table and the landing position determined in step S402, based on the present position and the landing position. Thereafter, control proceeds to step S405.

In step S405, the CPU 2 calculates initial ball speed of the ball B. The processing in step S405 is the same as the processing in step S103 (see FIG. 13), and hence will not be described in detail below. Thereafter, control proceeds to step S406.

In step S406, the CPU 2 controls the ball B to fly. The processing in step S406 is the same as the processing in step S104 (see FIG. 13), and hence will not be described in detail below. Thereafter, control proceeds to step S407.

In step S407, the CPU 2 moves the viewpoint EP toward the landing position, i.e., the first cursor K1. At this time, the viewpoint EP is accelerated at a speed higher than the speed of the ball B along a path parallel to the sidelines of the court 50 (see FIG. 7). The monitor TV displays the court 50 as it moves relatively to the right on the display screen, and the ball B as it disappears from the right-hand edge of the display screen. Thereafter, control proceeds to step S408.

In step S408, the CPU 2 gradually reduces the speed of the viewpoint EP after it has passed the intermediate position calculated in step S404. Thereafter, control proceeds to step S409.

In step S409, the CPU 2 decides whether the viewpoint EP has reached the landing position, i.e., the first cursor K1, or more specifically whether the viewpoint EP and the center of the first cursor K1 lie on the same plane or not. If the viewpoint EP has not reached the landing position (NO in step S409), then control goes back to step S408, and the CPU 2 executes steps S408, S409 until the viewpoint EP has reached the landing position. If the viewpoint EP has reached the landing position (YES in step S409), then control proceeds to step S410.

In step S410, the CPU 2 stops the movement of the viewpoint EP. At this time, the monitor TV displays the image shown in FIG. 9. Thereafter, control proceeds to step S411.

In step S411, the CPU 2 decides whether the ball B has come near the landing position or not. If the ball B has come near the landing position (YES in step S411), then control goes to step S412. If the ball B has not come near the landing position (NO in step S411), then the CPU 2 repeats the processing in step S411 until the ball B has come near the landing position.

If control goes from step S411 to step 412, then the CPU 2 decides whether the ball B has been received by any player character M or not. If the ball B has been received by any player character M (YES in step S412), then control returns to step S401, and steps S401–S412 are repeated until the ball B has been decided as being not received by any player character M. If the ball B has not been received by any player character M (NO in step S412), then control goes to step S413.

In step S413, the CPU 2 keeps the viewpoint E fixed. After step S413, the viewpoint changing process is brought to an end. Thereafter, the CPU 2 displays a volleyball game start image again on the display screen of the monitor TV. If the set is over, then the CPU 2 displays a set end image on the display screen of the monitor TV. If the volleyball match is over, then the CPU 2 displays a game end image on the display screen of the monitor TV.

The RAM 4 stores a threshold value for changing the viewpoint EP depending on the height of the ball B. In the viewpoint changing process shown in FIG. 18, the CPU 2 compares, from time to time, the height of the ball B, i.e., the position of the ball B stored in the position table, with the threshold value. Insofar as the height of the ball B is greater than the threshold value, the CPU 2 moves the viewpoint EP a certain distance perpendicularly to the plane of the court 50, and then moves the viewpoint EP parallel to the sidelines of the court 50. Therefore, if the ball B would move out of the visible range, i.e., disappear out of the upper edge of the display screen, with a normal view-point height as when a player character M attacks the ball B back in the game space displayed on the monitor TV, then the viewpoint EP is raised to prevent the ball B from disappearing from the display screen of the monitor TV.

In the volleyball video game system according to the present invention, the CPU 2 determines the position of the ball B in the virtual game space, then moves the viewpoint EP depending on the positional data of the viewpoint and the position of the ball B, and displays the court 50 in a visible range determined on the viewpoint EP and the axis EA on the monitor TV. The viewpoint EP is established such that a portion of the court 50 in the visible range.

Therefore, the player characters M, E can be displayed on the monitor TV in sizes that allow realistic movements thereof to be visually presented on the monitor TV. Since the CPU 2 changes the viewpoint EP depending on the movement of the ball B, the monitor TV displays the court 50 as it relatively moves depending on the movement of the ball B. Therefore, until the volleyball game is interrupted due to an error or ball out, the monitor TV can continuously display the game space. Consequently, even when the ball B disappears from the display screen, the game player can easily recognize whereabouts of the ball B.

When the ball B moves from the court section of the volleyball team E to the court section of the volleyball team M at the time the ball B is served, for example, the viewpoint EP moves faster than the ball B toward a movement end position. Until the ball B comes over the court section of the volleyball team M, the CPU 2 displays the first and second cursors K1, K2. Therefore, the game player can operate the control panel CP appropriately for controlling player characters to perform a receiving action.

When the game player controls player characters to make a receiving action, the CPU 2 displays the first cursor K1 indicative of the landing position of the ball B on the monitor TV. When the game player controls the player character M closest to the first cursor K1 to make the distance between the first cursor K1 and the player character M, i.e., the second cursor K2, equal to the successful receiving distance, the CPU 2 automatically causes the player character M to perform a receiving action.

Therefore, even if the game player is not accustomed to the volleyball video game system or cannot operate the control panel CP sufficiently skillfully, the game player can control game players to make a receiving action more easily than with the conventional video game machines. The volleyball video game system according to the present invention allows game players to enjoy the volleyball game irrespective of their level of skill about operating the control panel CP, and is effective to arose interest in volleyball games of game players who have tended to keep away from volleyball video game machines.

Since the second cursor K2 is displayed around the feet of a player character M which is going to make a receiving action, the game player can easily recognize the player character M which the game player is to control.

Furthermore, when the ball B is set by either one of the player characters M, the ball B changes its color for a predetermined time. When the game player presses the first button,C1a or C1b while the ball B is changing its color, the CPU 2 controls the player character M to perform an attacking action depending on the pressed button. Therefore, the game player can have the player character M make more various attacking actions than with the conventional video game machines. Consequently, the game player finds it interesting to play a volleyball game on the volleyball video game system.

When the ball B is set, if the game player presses at least two of the first buttons C1a–C1c, the CPU 2 controls the player character corresponding to the finally pressed button, of those player characters selected as attackers, to make an attacking action, and also controls the other attackers to fake spiking. The game player can thus control a plurality of player characters to engage in a combination play. The volleyball video game system according to the present invention can, therefore, supply a realistic volleyball game, similar to actual volleyball, to the game player. Since the sequence with which player characters engage in a combination play can be changed by the sequence with which the game player presses buttons, the game player can control game players M to make a variety of combination plays.

If the game player presses the first buttons C1a–C1c or the second buttons C2a–C2c when the ball B is set and its color is changed, the CPU. 2 causes player characters M or E corresponding to the pressed buttons to make a blocking action. The CPU 2 may perform a two-player or threeplayer blocking action depending on the number of buttons which the game player presses. This is also effective to supply a realistic volleyball game to the game player.

The volleyball video game system according to the present invention is typically useful as an arcade video game system. However, the volleyball video game system according to the present invention may be used as a home video game system.

Although a certain preferred embodiment of the present invention has been shown and described in detail, it should be understood that various changes and modifications may be made therein without departing from the scope of the appended claims.

What is claimed is:

1. A video game machine for playing a volleyball video game, comprising:
   a monitor for displaying two volleyball teams on a court in a virtual space, at least one of the volleyball teams having player characters controllable by a game player;
   control means operable by the game player for controlling the player characters;
   position determining means for determining a landing position of a ball in the virtual space;
   indicating means for displaying an indicia at the determined landing position of the ball on said monitor;
   action control means for controlling any one of at least a portion of the player characters to make a receiving action to receive the ball until said ball reaches said landing position; and
   automatic receiving action means for automatically implementing the receiving action when said any one of said at least the portion of the player characters and said indicia are spaced from each other by a predetermined distance.

2. A video game machine for playing a volleyball video game, comprising:
   a monitor for displaying two volleyball teams on a court in a virtual space, at least one of the volleyball teams having player characters controllable by a game player;
   control means operable by the game player for controlling the player characters;
   position determining means for determining a landing position of a ball in the virtual space;
   indicating means for displaying an indicia at the determined landing position of the ball on said monitor;
   action control means for controlling any one of at least a portion of the player characters to make a receiving action to receive the ball when said any one of at least the portion of the player characters and said indicia are spaced from each other by a predetermined distance until said ball reaches said landing position;
   selecting means for selecting said any one of at least the portion of the player characters to make the receiving action based on the determined landing position; and
   assigning means for assigning said control means to the selected player character.

3. A video game machine according to claim 2, wherein said indicating means comprises means for displaying a second indicia with respect to said any one of at least the portion of the player characters selected by said selecting means.

4. A video game machine according to claim 1, wherein said automatic receiving action means includes control disabling means for disabling control of said any one of at least the portion of the player characters when said at least the portion of the player characters and said indicia are spaced from each other by a predetermined distance until said ball reaches said landing position.

5. A video game machine according to claim 4, wherein said automatic receiving action means further includes automatic player character movement means for automatically moving said any one of at least the portion of the player characters to said landing position when said control disabling means disables control.

6. A method of processing video game images for a video game machine for playing a volleyball video game by displaying two volleyball teams on a court in a virtual space, at least one of the volleyball teams having player characters controllable by a game player, the method comprising the steps of:
   determining a landing position of a ball in the virtual space;
   displaying an indicia at the determined landing position of the ball on said monitor;
   controlling any one of at least a portion of the player characters to make a receiving action to receive the ball until said ball reaches said landing position; and
   automatically implementing the receiving action when said any one of said at least the portion of the player characters and said indicia are spaced from each other by a predetermined distance.

7. A method according to claim 6, farther comprising the step of disabling control of said any one of at least the portion of the player characters when said at least the portion of the player characters and said indicia are spaced from each other by a predetermined distance until said ball reaches said landing position.

8. A method according to claim 7, further comprising the step of automatically moving said any one of at least the portion of the player characters to said landing position when said control is disabled in said step of disabling.

9. A recording medium storing a computer program for controlling a video game machine for playing a volleyball video game by displaying two volleyball teams on a court in a virtual space, at least one of the volleyball teams having player characters controllable by a game player, said computer program comprising the steps of:
   determining a landing position of a ball in the virtual space;
   displaying an indicia at the determined landing position of the ball on said monitor;
   controlling any one of at least a portion of the player characters to make a receiving action to receive the ball until said ball reaches said landing position; and
   automatically implementing the receiving action when said any one of said at least the portion of the player characters and said indicia are spaced from each other by a predetermined distance.

10. A recording medium according to claim 9, wherein said computer program further comprises the step of disabling control of said any one of at least the portion of the player characters when said at least the portion of the player characters and said indicia are spaced from each other by a predetermined distance until said ball reaches said landing position.

11. A recording medium according to claim 10, wherein said computer program further comprises the step of automatically moving said any one of at least the portion of the player characters to said landing position when said control is disabled in said step of disabling.

12. A method of processing video game images for a video game machine for playing a volleyball video game by displaying two volleyball teams on a court in a virtual space, at least one of the volleyball teams having player characters controllable by a game player, the method comprising the steps of:

determining a landing position of a ball in the virtual space;

displaying an indicia at the determined landing position of the ball on said monitor;

selecting any one of at least a portion of the player characters to make the receiving action based on the determined landing position;

assigning game player control to said any one of at least a portion of the player characters selected in said step of selecting; and controlling said any one of at least the portion of the player characters to make a receiving action to receive the ball when said any one of at least the portion of the player characters and said indicia are spaced from each other by a predetermined distance until said ball reaches said landing position.

13. A method according to claim 12, further comprising the step of displaying a second indicia with respect to said any one of at least a portion of the player characters selected in said step of selecting.

14. A recording g medium storing a computer program for controlling a video game machine for playing a volleyball video game by displaying two volleyball teams on a court in a virtual space, at least one of the volleyball teams having a plurality of player characters controllable by a game player, said computer program comprising the steps of:

determining a landing position of a ball in the virtual space;

displaying an indicia at the determined landing position of the ball on said monitor;

selecting any one of at least a portion of the player characters to make the receiving action based on the determined landing position;

assigning game player control to said any one of at least a portion of the player characters selected in said step of selecting; and controlling said any one of at least the portion of the player characters to make a receiving action to receive the ball when said any one of at least the portion of the player characters and said indicia are spaced from each other by a predetermined distance until said ball reaches said landing position.

15. A recording medium according to claim 14, wherein said computer program further comprises the step of displaying a second indicia with respect to said any one of at least a portion of the player characters selected in said step of selecting.

\* \* \* \* \*